(12) United States Patent
Butyn et al.

(10) Patent No.: US 12,374,031 B2
(45) Date of Patent: Jul. 29, 2025

(54) LIGHT FIELD OFFSET RENDERING

(71) Applicant: Avalon Holographics Inc., St. John's (CA)

(72) Inventors: Thomas Butyn, St. John's (CA); Colton Smith, Clarenville (CA)

( * ) Notice: Subject to any disclaimer, the term of this patent is extended or adjusted under 35 U.S.C. 154(b) by 563 days.

(21) Appl. No.: 17/663,943

(22) Filed: May 18, 2022

(65) Prior Publication Data

US 2023/0377250 A1    Nov. 23, 2023

(51) Int. Cl.
*G06T 15/50* (2011.01)
*G06T 7/557* (2017.01)

(52) U.S. Cl.
CPC ............ *G06T 15/506* (2013.01); *G06T 7/557* (2017.01)

(58) Field of Classification Search
CPC .... H04N 19/172; H04N 19/33; H04N 19/146; H04N 13/302; H04N 19/187; H04N 19/132; H04N 19/597; H04N 13/161; H04N 19/119; H04N 2013/0088; G06T 7/557; G06T 17/00; G06T 15/06; G06T 15/506
See application file for complete search history.

(56) References Cited

U.S. PATENT DOCUMENTS

| | | | |
|---|---|---|---|
| 6,097,394 A | 8/2000 | Levoy et al. | |
| 7,532,772 B2 | 5/2009 | Brady | |
| 8,971,625 B2 | 3/2015 | Pitts et al. | |
| 9,445,081 B1 | 9/2016 | Kouperman et al. | |
| 10,003,786 B2 | 6/2018 | Kouperman et al. | |
| 10,275,898 B1* | 4/2019 | Song | H04N 13/243 |
| 10,522,113 B2 | 12/2019 | Schluessler et al. | |
| 10,540,818 B2* | 1/2020 | Akeley | G06T 19/006 |
| 11,537,892 B2* | 12/2022 | Yan | G06N 3/082 |
| 11,551,426 B2* | 1/2023 | Sloane | G06T 1/0028 |
| 11,562,530 B2* | 1/2023 | Hamilton | G06T 15/503 |
| 2006/0114254 A1 | 6/2006 | Day et al. | |
| 2014/0168213 A1 | 6/2014 | Rice | |
| 2015/0201176 A1* | 7/2015 | Graziosi | H04N 13/243 348/43 |
| 2017/0142427 A1* | 5/2017 | Graziosi | H04N 19/154 |
| 2017/0261758 A1* | 9/2017 | Powell | H04N 13/128 |

(Continued)

FOREIGN PATENT DOCUMENTS

WO    2021093432 A1    5/2021

OTHER PUBLICATIONS

Do, Luat, and Sveta Zinger. "Quality improving techniques for free-viewpoint DIBR." Stereoscopic Displays and Applications XXI. vol. 7524. International Society for Optics and Photonics, 2010.

(Continued)

*Primary Examiner* — Abderrahim Merouan

(57) ABSTRACT

A method for light field rendering of a 3D scene data. The rendering method comprises capturing a light field image at a retracted plane, parallel to the display plane, decoding a light field camera to produce a hogel camera for each hogel at the retraction plane to produce an integral image, and applying a pixel remapping technique to the pixels of the integral image for display on a light field display. The 3D scene is captured and remapped to adjust the perspective giving the illusion the image was taken at the display plane, allowing captured images to be displayed in both the inner frustum and outer frustum of a light field display, creating an immersive experience.

22 Claims, 17 Drawing Sheets

(56) References Cited

U.S. PATENT DOCUMENTS

| | | | |
|---|---|---|---|
| 2018/0249151 A1 | 8/2018 | Freeman et al. | |
| 2020/0275075 A1* | 8/2020 | Hamilton | H04N 19/172 |
| 2021/0203903 A1* | 7/2021 | Hamilton | H04N 19/146 |
| 2021/0335031 A1* | 10/2021 | Hamilton | G06T 15/06 |
| 2022/0012860 A1 | 1/2022 | Zhang et al. | |
| 2023/0377250 A1* | 11/2023 | Butyn | G06T 15/205 |

OTHER PUBLICATIONS

Gambetta, G., Describing and Rendering a Scene, Computer Graphics from Scratch, 2021, Retrieved Aug. 31, 2021.

Han, Charles, "Translation-capable Panorama Using Light Field Imaging", Student paper for Department of Electrical Engineering, Stanford University.

Indrajit, Kurmi R., et al., "True Zoomed Light Field Panorama", 2015 IEEE International Advance Computing Conference (IACC), Jun. 12, 2015, p. 1219-1223, Bangalore, India.

Indrajit, Kurmi, "True Zoom with Cylindrical Light Feld System", International Conference on Computer Vision and Graphics, Sep. 2014, p. 278-285, LNCS 8671, Springer International Publishing Switzerland 2014.

Levoy, Marc, Hanrahan, Pat, "Light Field Rendering", SIGGRAPH '96: Proceedings of the 23rd annual conference on Computer graphics and interactive techniques, Aug. 1996, p. 31-42, Association for Computing Machinery, New York, USA.

Li, Hui, et al. "Optimized layered method for real-time interactive holographic display based on ray-tracing technique." Optical Engineering 59.10 (2020): 102408.

Liu, Wei et al, "Scene Background Estimation Based on Temporal Median Filter with Gaussian Filtering", 2016 23rd International Conference on Pattern Recognition (ICPR), Dec. 4, 2016, p. 132-136, Cancun, Mexico.

Rother, Carsten, Kolmogorov, Vladimir, Blake, Andrew, ""GrabCut": Interactive Foreground Extraction using Iterated Graph Cuts", ACM Transactions on Graphics, Aug. 2004, p. 309-314, vol. 23, Issue 3, Association for Computing Machinery, USA.

Masia, B. et al. "Display Adaptive 3D Content Remapping." Computers & Graphics 37, No. 8 (Dec. 2013): 983-996.

\* cited by examiner

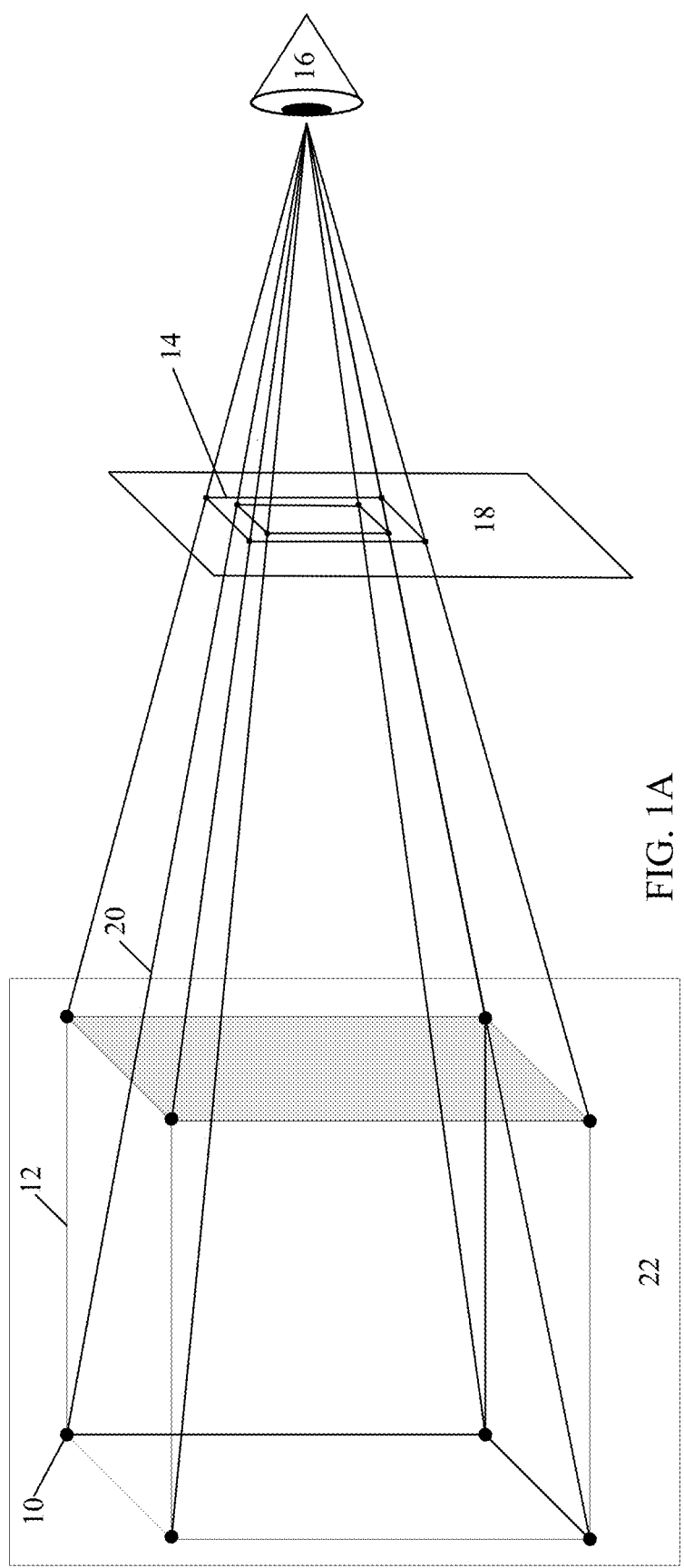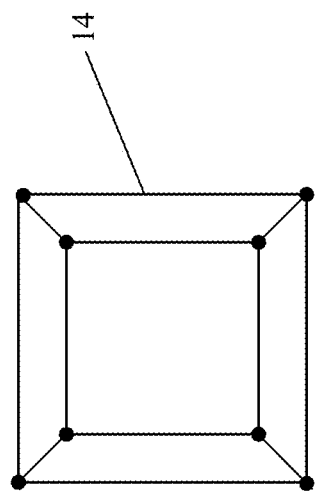
FIG. 1A
FIG. 1B

LIGHT FIELD OFFSET RENDERING

FIELD OF THE INVENTION

The present disclosure relates to a light field rendering method employing a light field offset scheme and pixel remapping technique. The present disclosure also relates to the use of image rasterization to render a light field.

BACKGROUND OF THE INVENTION

Light field displays recreate the experience of viewing the real world through a window by replicating the light field that describes all rays of light associated with a particular scene. Creating images for standard displays from three dimensional (3D) scenes is referred to as rendering, or light field rendering. One rendering method, ray tracing, is done by modeling light in the scene. The ray tracing model can then be used in a wide variety of rendering algorithms for generating digital images from the light model. Another rendering method referred to as rasterization takes an image described in a vector graphics format or shape and converts it into a raster image, which is a series of pixels, dots, or lines, which, when displayed together, create the image which was represented via shapes. Ray tracing is best suited for light field rendering, however many features of content creation tools do not support ray tracing. Therefore, rasterization approaches that sacrifice fast render times may be used as offline renderers to generate high quality content for light field displays.

Existing 3D display technologies can be divided into two categories, binocular stereoscopic and autostereoscopic. Binocular stereoscopic displays use special eyewear to facilitate the viewing of two slightly different images in the left and right eyes, creating depth cues. Autostereoscopic displays permit the viewer to see, with the naked eye, different images depending on where they are viewing the display from. This can be compared to a person looking through a window: from the left side looking out they see an entirely different image than from the right side. Traditional two-dimensional light field displays cannot provide appropriate depth cues for the brain to interpret images viewed on them as it would interpret real world objects, at least because the displayed image is not stereoscopic and both eyes are viewing the same image.

One class of autostereoscopic display technology, Multi-view 3D, approximates the light field associated with a scene. Defined as a function that describes the amount of light flowing in every direction through points in space free of occluding objects, the light field contains information about all images that can be seen from all possible combinations of viewing position and angle relative to the display surface. An actual light field contains an infinite, continuous number of light rays. In practice, and in order to limit the amount of data required to describe the scene, rendered light fields are discretized by selecting a finite set of "views", which are used to estimate the actual light field at any given location from the 3D display.

In an example of light field rendering, Do et al. (Do, Luat, and Sveta Zinger. "Quality improving techniques for free-viewpoint DIBR." Stereoscopic Displays and Applications XXI. Vol. 7524. International Society for Optics and Photonics, 2010) describe a rendering algorithm based on depth image warping between two reference views from existing cameras. While experimenting with synthetic data, it is observed that the rendering quality is highly dependent on the complexity of the scene and this method is performed using compressed video from surrounding cameras. The overall system quality is dominated by the rendering quality and not by coding, therefore rendering times are high and advanced computational power is required.

In another example of light field rendering, Li et al. (Li, Hui, et al. "Optimized layered method for real-time interactive holographic display based on ray-tracing technique." Optical Engineering 59.10 (2020): 102408) describe an optimized layered rendering method for real-time interactive holographic display based on ray-tracing technique is presented in order to overcome light field rendering challenges and realize real-time interaction of three-dimensional scenes. The reconstructed holographic image with real depth cues is demonstrated by the experiments, and the optical reconstruction images can be interacted in real-time, however the ray-tracing based approach requires high computational power.

In another example, U.S. patent application publication number US20220012860 to Zhang et al. describes a method and apparatus to synthesize six degree-of-freedom views from sparce red-green-blue (RGB) depth inputs. An example apparatus includes at least one memory, instructions in the apparatus, and processor circuitry to execute the instructions to reproject a first depth view and a second depth view to a target camera position to obtain a first reprojected view and a second reprojected view, combine the first reprojected view and the second reprojected view into a blended view, including missing RGB depth information due to at least one of an occlusion or a disocclusion and generate a six degree-of-freedom synthesized view of the blended view data, the synthesized view including the missing RGB depth information. The method requires at least two views and reprojecting each view separately, then blending said views to generate a synthesized view.

Based on the directionality of pixels in a light field display (LFD), utilizing ray tracing for light field rendering is an organic approach, and has been thoroughly researched. It is the fastest method described for light field rendering and could be used for real time rendering, allowing for interactive light field experiences like video games. However, many existing tools used by content creators do not support ray tracing to the extent required to implement high quality light field rendering. Enabling designers to quickly transition to generating content for LFDs is desirable, as integration with existing architecture is pivotal to the development and adoption of new technology. Therefore, in applications where quality is prioritized over speed, such as offline rendering, there remains a need for a high performing light field rendering method with rasterization with reduced rendering time. A rendering method using rasterization is desired as commercially available real-time rendering software which is designed to present images at or faster than 30 frames per second, including, but not limited to, Unreal Engine®, Maya, Blender®, and Unity, can be configured to render light field images in addition to conventional 2D images.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

It is an object of the present invention to provide a light field rendering method which uses a light field offset scheme and pixel remapping technique to render a 3D light field. It is another object of the present invention to provide a method for light field mapping and rendering using image rasterization.

According to an aspect there is provided a computer-implemented light field rendering method comprising: defining a display plane for a light field, the light field comprising an inner frustum volume bounded by the display plane and a far clip plane and an outer frustum volume bounded by the display plane and a near clip plane; defining a retraction plane parallel to and at an integral offset distance from the display plane, the retraction plane comprising a plurality of light field cameras spaced at a sample gap; capturing a view of the 3D scene as a source image at each of the plurality of light field cameras; decoding each source image to generate a plurality of hogel cameras on the retraction plane, each hogel camera providing an elemental image; generating an integral image comprising a plurality of pixels from the elemental images at the retraction plane; and executing a pixel remapping technique on individual pixels in the integral image to create a rendered light field image at the display plane.

In an embodiment of the method, the portion of the 3D scene captured at the retraction plane comprises image information from the inner frustum volume and the outer frustum volume.

In another embodiment of the method, the captured 3D scene comprises all of the image information in the outer frustum volume.

In another embodiment of the method, the integral offset distance is calculated from the focal length, directional resolution of the light field camera, and an offset integer, N.

In another embodiment of the method, the offset integer $N \geq 1$.

In another embodiment of the method, the retraction plane is positioned at the near clip plane.

In another embodiment, the method further comprises displaying the rendered light field image on a light field display.

In another embodiment of the method, the retraction plane surface area is greater than the display plane surface area.

In another embodiment of the method, the optical properties of the light field camera are orientation, lens pitch, directional resolution, and field of view.

In another embodiment, the method further comprises comprising generating a plurality of integral images at a plurality of retraction planes.

In another embodiment, the method further comprises compositing the plurality of integral images to create a composited rendered light field image at the display plane.

In another embodiment of the method, compositing incorporates transparency data.

In another embodiment of the method, each light field camera is one of a digital single reflex mirror (DSLR) camera, pinhole camera, plenoptic camera, compact camera, and mirrorless camera.

In another embodiment of the method, each light field camera is a computer-generated camera.

In another embodiment of the method, the pixel remapping technique causes the pixels to change their hogel index $(H_x, H_y)$ from the retraction plane to the display plane.

In another embodiment of the method, the retraction plane is outside of the outer frustum volume.

In another aspect there is provided a computer-implemented method of displaying a light field image comprising: capturing a first light field at a retraction plane relative to a light field display plane using a light field camera, the first light field comprising an array of retraction plane hogels, each hogel having a plurality of pixels; assigning a hogel index $(H_x, H_y)$ and a pixel index $(P_x, P_y)$ to each pixel in each retraction plane hogel to indicate its position in the light field display by applying a pixel remapping technique to select a single pixel from each retraction plane hogel; loading each pixel from the light field at the retraction plane $(LF_r)$ and storing each pixel to the light field at the display plane $(LF_d)$ using a compositing function; and generating a light field image at the display plane comprising remapped pixels.

In another embodiment of the method, one pixel from the retraction plane produces one pixel at the display plane.

In another embodiment of the method, applying a pixel remapping technique changes the hogel index $(H_x, H_y)$ of each pixel in each retraction plane hogel and the pixel index $(P_x, P_y)$ remains constant.

In another embodiment of the method, the pixel remapping technique is a function of the directional resolution of the light field display and an offset parameter, N.

In another embodiment of the method, the pixel remapping technique is based on the equation $LF_r[H_x+(DR_x*N)-(N*P_x), H_y+(DR_y*N)-(N*P_y), P_x, P_y] \Rightarrow LF_d[H_x, H_y, P_x, P_y]$.

In another embodiment of the method, the offset integer $N \geq 1$.

In another embodiment of the method, the retraction plane is comprised of a sufficient number of hogels to provide the number of pixels to achieve the required directional resolution of light field display at the display plane.

In another embodiment of the method, the size of the display plane is defined by the directional resolution and spatial resolution of the light field display.

In another embodiment of the method, the light field camera is a mirror (DSLR) camera, pinhole camera, plenoptic camera, compact camera, or mirrorless camera.

BRIEF DESCRIPTION OF THE DRAWINGS

These and other features of the invention will become more apparent in the following detailed description in which reference is made to the appended drawings.

FIG. 1A is an illustration of one method of rasterization using frustum projection to flatten a 3D scene into a 2D image.

FIG. 1B is an illustration of a front view of a flattened 2D image.

DETAILED DESCRIPTION OF THE INVENTION

Definitions

Figure 2:
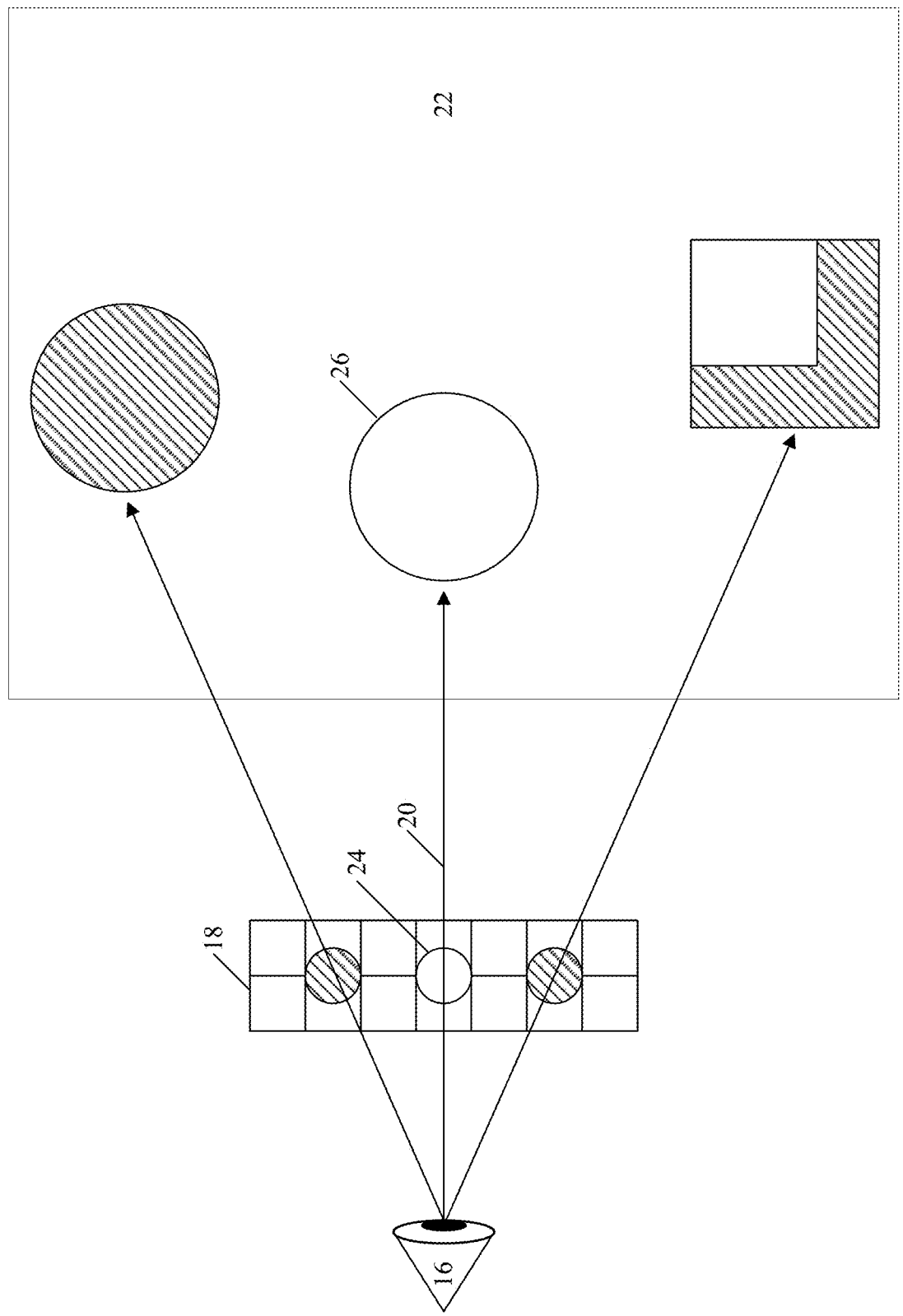
FIG. 2 is an illustration of an example ray tracing approach to solve a visibility problem.

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, device, article, system, use or method, denotes that additional elements and/or method steps may be present, but that these additions do not materially affect the manner in which the recited composition, device, article, system, method or use functions. A composition, device, article, system, use or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/-10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the term "pixel" refers to a light source and light emission mechanism used to create a display.

As used herein, the term "light field" at a fundamental level refers to a function describing the amount of light flowing in every direction through points in space, free of occlusions. The light field contains information about all images that can be seen from all possible combinations of viewing position and angle light flowing in every direction through points in space free of occluding objects for a particular display format. Therefore, a light field represents radiance as a function of position and direction of light in free space. A light field can be synthetically generated through various rendering processes or may be captured from a light field camera or from an array of light field cameras. In a broad sense, the term "light field" can be described as an array or subset of hogels.

As used herein, the term "hogel" is a holographic element, which is a cluster of traditional pixels with directional control. An array of hogels can generate a light field. As a pixel describes the spatial resolution of a two-dimensional display, a hogel describes the spatial resolution of a three-dimensional display.

As used herein, the term "light field display" is a device which reconstructs a light field from a finite number of light field radiance samples input to the device. The radiance samples represent the color components red, green and blue (RGB). For reconstruction in a light field display, a light field can also be understood as a mapping from a four-dimensional space to a single RGB color. The four dimensions include the vertical and horizontal dimensions (x, y) of the display and two dimensions describing the directional components (u, v) of the light field. A light field is defined as the function:

$$LF:(x,y,u,v) \to (r,g,b)$$

For a fixed $x_f$, $y_f$, $LF(x_f, y_f, u, v)$ represents a two-dimensional (2D) image referred to as an "elemental image". The elemental image is a directional image of the light field from the fixed $x_f$, $y_f$ position. When a plurality of elemental images are connected side by side, the resulting image is referred to as an "integral image". The integral image can be understood as the entire light field required for the light field display.

As used herein, the term "display plane" refers to the set of points and directions as defined by a planar display and physical spacing of its individual light field hogel elements, as in a traditional 3D display. In the abstract mathematical sense, a light field may be defined and represented on any geometrical surface and may not necessarily correspond to a physical display surface with actual physical energy emission capabilities. The inner frustum volume and the outer frustum volume are light field regions that extend above and below, or behind and in front of, respectively, from the display plane. The inner frustum volume and outer frustum volume may have differing numbers of layers, have different volumes, have different depths, and may be rendered using different rendering techniques.

As used herein, the term "voxel" refers to a single sample, or data point, on a regularly spaced, three-dimensional grid consisting of a single piece of data. A voxel is an individual volume element corresponding to a location in three-dimensional data space and has one or more data values associated with it.

As used herein, the term "description of a scene" refers to a geometric description of a three-dimensional scene that can be a potential source from which a light field image or light field video can be rendered. This geometric description may be represented by, but is not limited to, points, lines, quadrilaterals, textures, parametric surfaces, and polygons.

As used herein, the term "extra-pixel information" refers to information included in the description of a scene. The extra-pixel information includes, but is not limited to color, depth, surface coordinates, normals, material values, transparency values, and other possible scene information.

As used herein, the term "source image" refers to the image of the light field captured at a single location in a camera array.

As used herein, the term "elemental image" represents a two-dimensional (2D) image $LF(x_f, y_f, u, v)$ for a fixed position $x_f, y_f$. The elemental image is a directional image of the light field from the fixed $x_f, y_f$ position.

As used herein, the term "integral image" refers to a plurality of elemental images connected side by side, the resulting image therefore referred to as the "integral image". The integral image can be understood as the entire light field required for the light field display. The rendered light field image is a rendering or mapping of the integral image that can be displayed at the display plane.

It is contemplated that any embodiment of the compositions, devices, articles, methods, and uses disclosed herein can be implemented by one skilled in the art, as is, or by making such variations or equivalents without departing from the scope of the invention.

Various features of the invention will become apparent from the following detailed description taken together with the illustrations in the Figures. The design factors, construction and use of the light field volume rendering technique(s) disclosed herein are described with reference to various examples representing embodiments which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope of the invention.

Herein is described a light field rendering method using a light field offset scheme and pixel remapping technique to capture inner and outer frustum light field data from a 3D scene. In the present method a camera array is positioned at a retraction plane at an integral offset distance from the display plane away from the inner frustum volume, either inside or outside the outer frustum volume, to capture the scene. Capturing the scene with the camera array at the retraction plane enables the whole of the inner frustum volume of the light field to be captured as well as some or all of the outer frustum volume. A pixel remapping function is employed to shift the resulting light field back to the display plane to display the light field as if the camera array was originally positioned at the display plane. As a result, the light field captured by the camera array comprises more of the 3D scene than would otherwise be captured if the camera array were positioned at the display plane. In particular, the present method reduces or eliminates the blind volume in both the inner frustum and outer frustum, enabling more complete capture and rendering of the 3D scene. The captured 3D scene can then be presented on a 3D light field display.

The present technique can be implemented, for example, in game engines, such as Unreal Engine®, and used to capture features of light field image data such as advanced lighting and physically based rendering materials. The presently described light field rendering method also reduces light field rendering times and processing requirements compared with existing offline renderers, such as Octane® by using a rasterization technique rather than a ray tracing technique which is computationally intensive in comparison. Overall, using a light field offset scheme to capture double frustum light fields with rasterization is a viable technique for use in 3D scene rendering, in particular in offline rendering. The placement and number of light field cameras in the retracted camera array can also provide a large enough area to capture the entire intended light field volume intended frustum, thereby significantly reducing the size of the 3D source data to be rendered while also providing a more complete rendering of the 3D scene.

The present disclosure presents and details the concept of using a retraction plane for light field rendering. The presently described retraction plane function defines the geometry of the retraction plane, and the sample gap between cameras in the camera array at the retraction plane specifies the light field camera spacing in the camera array at the retraction plane. The sample gap between light field cameras can also be understood as the distance between the light field cameras located at the retraction plane, where the intermediate space between cameras is occupied by virtual hogel cameras that are created with pixel remapping to generate an integral image of the 3D scene at the retraction plane.

Rendering is the process of converting a 3D scene into a 2D image. Aside from some artistic rendering techniques, the goal of rendering is usually to create a photorealistic image that is indiscernible from reality, a common theme in the field of computer graphics. Before a renderer (program that performs rendering) can turn a 3D scene into an image, geometry must be defined in a format that can be interpreted by a computer. Geometry is represented using a combination of points in 3D space, each defined as a vector with x, y, and z components. Most commonly, geometry is represented using triangles, which are the simplest way to define a plane and are used as the building block of all polygons. To generate a 2D image for a light field display from a 3D scene, where the 2D image displays the 3D scene, the geometry within the scene must be "flattened" onto a canvas at the display plane representing the screen. There are two general methods used to create a 2D image from geometry: rasterization and ray tracing. Once a 2D image is produced that accurately reflects how the eye would view the 3D scene, the appearance of objects in the scene must be recreated as well. The appearance of an object in the scene, such as color, reflectivity, and texture, etc. depends on how the material the object is composed of interacts with light. These interactions are modelled using mathematical models based on the laws of physics.

By using a retraction plane to capture the 3D scene at an offset distance from the display plane, both the inner and outer frustum volumes of a light field can be captured. The present method results in less data to render the 3D scene into a 2D image resulting in faster rendering, as well as less data to transmit to the display surface for image display and overall less data to decode. Light fields are comprised of an array of hogels, and each hogel has a diameter that can be, for example, 0.1-25 mm. To capture an image for every hogel in the light field display would result in a required range of 100 to 100,000 captured images from a physical camera. Employing a light field camera array with the light field cameras positioned at a sample gap at a retraction plane to capture the 3D scene at an offset distance from the display plane enables both full light field capture as well as efficient light field rendering for 3D display.

FIG. 1A is an illustration of one method of rasterization using frustum projection to flatten a 3D scene into a 2D image. As shown, cube 12, representing a 3D scene 22, is flattened using frustum projection by tracing a plurality of rays 20 between each of the vertices 10 of an object in the 3D scene 22 and the eye of a viewer, or viewer at a viewing location 16, then finding points of intersection of these rays 20 with a display plane 18 representing a display screen. The points of intersection on the display plane can then be connected to create a 2D image 14. If the cube 12 were opaque, the output would not accurately reflect how the 3D scene 22 would be interpreted by the eye at the viewing location 16 as the front face of the cube 12 would hide all other faces and edges. Known as the "visibility problem", calculating what parts of the 3D scene 22 are visible is one of the fundamental concepts of light field rendering. One of the most common methods of solving the visibility problem using rasterization is the Z-buffering algorithm, which is a depth buffer used to render non-transparent objects in a 3D scene to correct for polygons that occlude other polygons. The Z-buffering algorithm, which is also known as the depth-buffer method, is an image space method based on the pixel to be drawn in 2D which compares surface depths at each pixel position on the projection plane where the z-axis is represented as the depth. When more than one point, or vertex 10, in the 3D scene geometry is projected to the same pixel in the display plane, they are added to a list called the depth buffer. The depth buffer is then sorted in order of increasing distance from the display plane 18. The first point in the depth buffer is then the closest to the display plane 18 and will be visible through the corresponding pixel of the light field display or screen at the display plane 18.

FIG. 1B illustrates a front view of a flattened 2D image 14 created by the intersection of each ray traced between the vertices of an object and a viewer's eye at a viewing location from a display surface or screen. In the projection example illustrated in FIG. 1A, each point or vertex 10 of each object in the 3D scene 22 was projected onto a flat canvas representing the screen at display plane 18. This process started from a known vertex 10 in the 3D scene 22 and found its location when projected onto the screen at display plane 18. Performing this series of steps in reverse is the basis of ray tracing.

FIG. 2 is an illustration of an example ray tracing approach to solve a visibility problem. As illustrated, first each pixel on display plane 18 is converted to a point 24 at the display plane 18. Then a ray 20 is traced from the eye of the viewer at a viewing location 16 through the point 24 and into the 3D scene 22 as illustrated. The point where the ray 20 intersects the scene geometry 26 will be the point visible through the pixel on the display plane 18. Like most algorithms that look to simulate the real world, the concept of ray tracing is simple to understand, yet resource and computationally intensive. In particular, ray tracing requires calculating the intersection point 24 of many rays 20 each with different kinds of geometry, and a great deal of research has been performed to optimize this calculation. Rasterization is still a faster solution to solving the visibility problem. In other words, to solve for visibility, rasterization actually "projects" geometry onto the display plane 18, from a 3D representation to a 2D representation of said geometry, using perspective projection.

Typical rendering generates a realistic 2D image from a 3D scene for viewing on a conventional 2D display. Similarly, at least a single realistic 3D image from a 3D scene to create 3D content that can be viewed on a 3D light field display (LFD). Light field rendering generates a light field from a 3D scene that can be loaded and viewed on a LFD. Light field rendering utilizes the same rendering techniques as regular displays, just applied differently to support multiple 3D views in a 3D scene. Based on the directionality of pixels in a LFD, utilizing ray tracing for light field rendering may be an organic approach, and has been thoroughly researched and could be used for real time rendering allowing for interactive light field experiences like video games. However, many existing software tools used by content creators do not support ray tracing to the extent required to implement high quality light field rendering. Enabling designers to quickly transition to generating content for LFDs is desirable, as integration with existing architecture is pivotal to the development and adoption of new technology. Therefore, in applications where quality is prioritized over speed, such as offline renderers, light field rendering with rasterization can be a viable and superior solution if ray tracing is not fully supported. One of the most widely used creation tools is Unreal Engine® 4 (UE4), which provides a platform for 3D creation in many technology areas, such as industrial and architectural visualization, gaming, visual effects, and film production. UE4 supports ray tracing for visual effects like reflection and refraction, but the primary scene rendering is performed using rasterization. UE4's rendering pipeline can be modified to use ray tracing, however, this breaks many of the advanced features designers use to create high quality content on the UE4 platform. To obtain real-time light field rendering, the sacrifice of quality for speed can be made. For offline rendering where quality is prioritized over speed a non-obtrusive rasterization approach with a high level of interoperability with engine features may be preferable to a faster ray tracing approach with minimal support for advanced engine features. As such, herein is described a new method for rendering double frustum light fields using frustum projections as an alternative to a modified engine for offline exporting of light fields.

Figure 3:
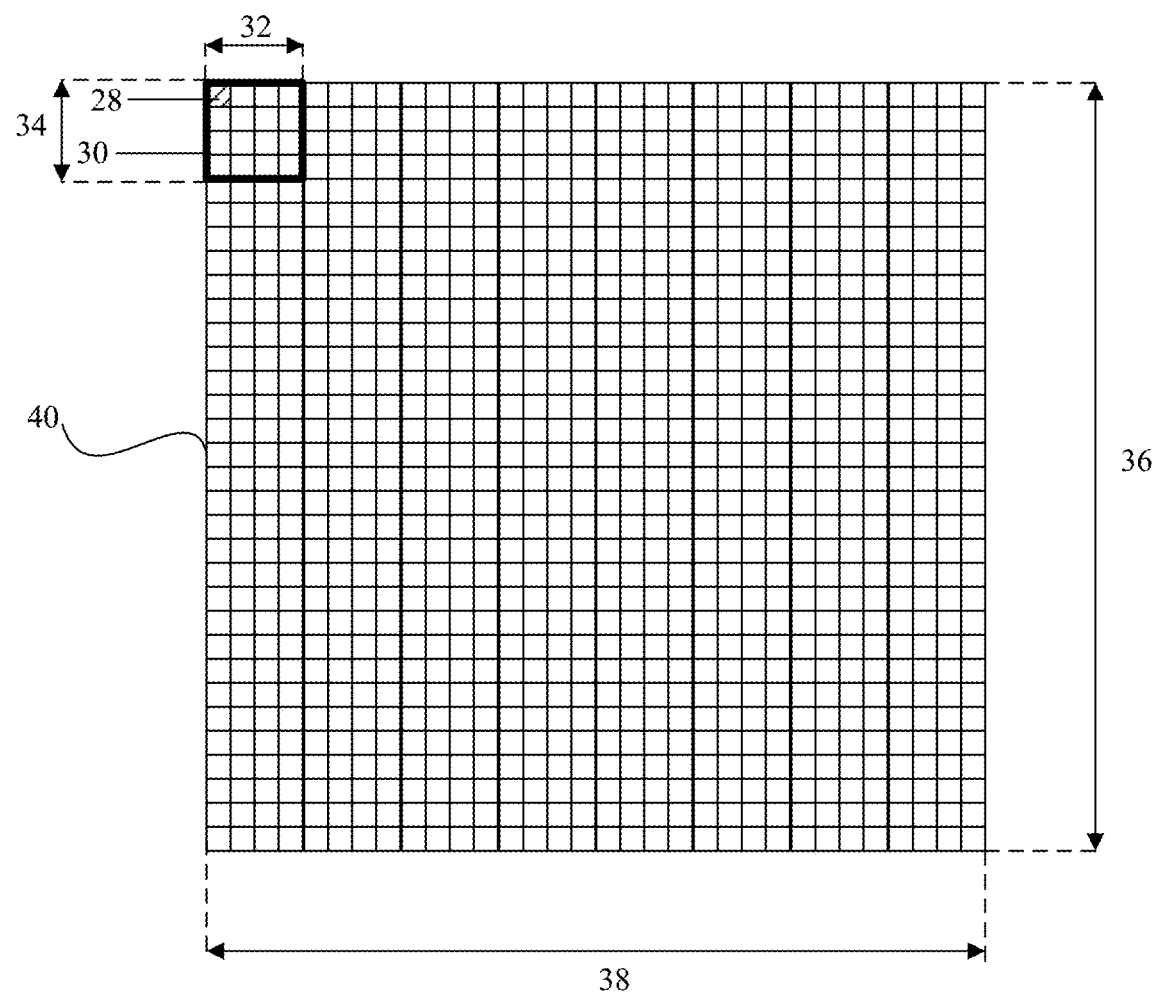
FIG. 3 is an illustration of an example digital representation of a ground truth image.

FIG. 3 illustrates a digital representation of a ground truth, no compression, light field. A digital image for use on a 2D display is simply a grid of pixels, where the height and width of the grid is known as the image resolution. A similar representation is used with LFDs. An image displayed on a LFD, hereafter referred to as a light field, is represented by a hogel grid 40 comprising a plurality of hogels 30, where the hogel width 38 ($SR_x$) and hogel height 36 ($SR_y$) of the hogel grid determine the spatial resolution of the display. Each hogel 30 is comprised of a grid of directional pixels 28 which produce or emit rays that convey information about the color, intensity, and direction of light at that point on the hogel grid 40. The individual hogel width 32 and hogel height 34 of each hogel 30 in the hogel grid 40 determine the directional resolution of the LFD, and the image formed by each hogel is known as an "elemental image". Therefore each single hogel 30 represents a single elemental image. In the example illustrated, the spatial resolution of this LFD would be 8×8 (hogels in the hogel grid 40) and the directional resolution would be 4×4 (directional pixels in each hogel 30).

Figure 4:
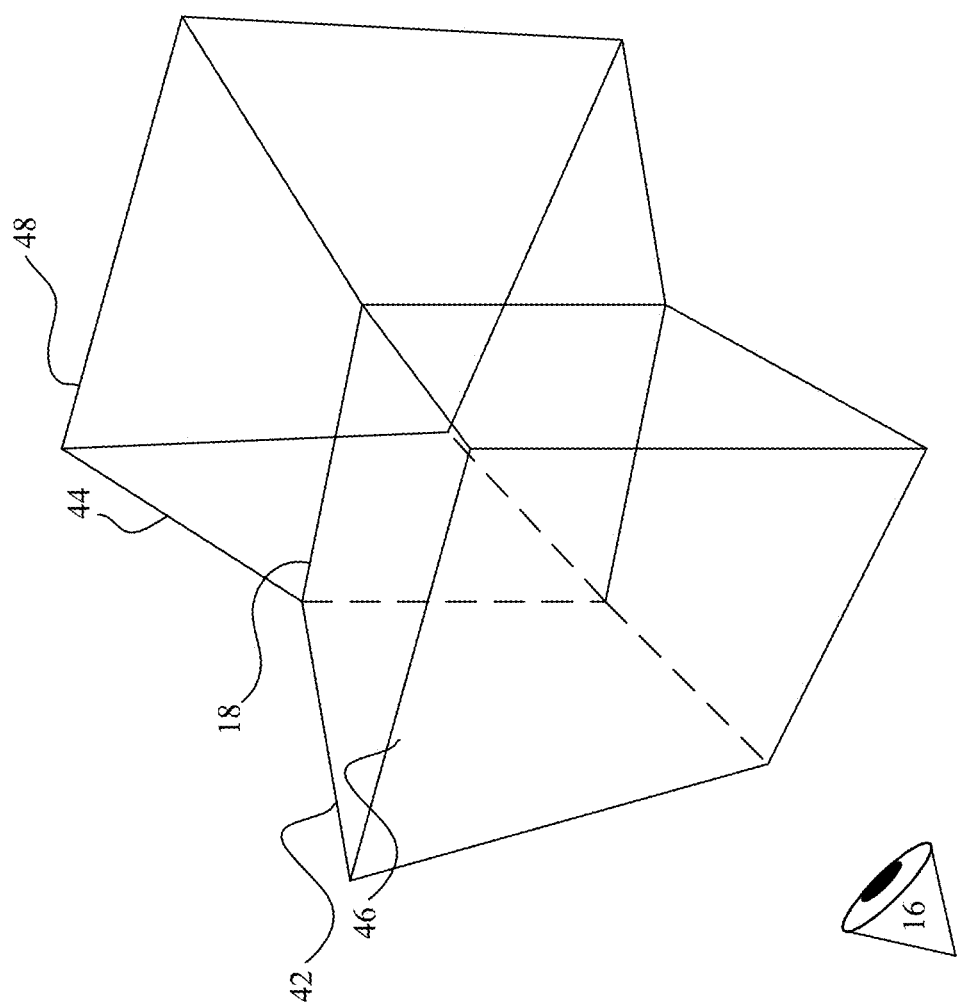
FIG. 4 is an illustration of an example method for rendering a light field showing inner and outer frusta.

FIG. 4 is an illustration of an example method for rendering a light field. The method illustrated entails capturing the volume of scene that can be viewed from a plane representing the screen, herein referred to as the display plane 18. The scene volume is defined by two "frusta", or truncated pyramids as shown, an outer frustum volume 42 proximal or near the viewer or human eye at a viewing location 16 and an inner frustum volume 44 distal or away from the viewer or viewing location 16. Recall that perspective projection is used to "flatten" a 3D scene into a 2D light field that can be displayed at the display plane 18. This process is also known as frustum projection because the frustum defines the volume of a 3D scene as seen by the human eye at a viewing location 16. The inner frustum volume 44 extends into the scene from the display plane 18, while the outer frustum volume 42 projects out of it. Objects in the inner frustum volume 44 will appear to the eye at the viewing location 16 to be "inside" the display at the display plane 18, while objects in the outer frustum volume 42 will appear to be projected out of the display at the display plane 18. The distance that the frusta extend into and out relative to the display plane 18 are defined by the far clip plane 48 and the near clip plane 46, respectively, and have a practical limit. As the viewer eye at the viewing location 16 moves in a horizontal direction parallel to the display plane 18, the viewer eye at the viewing location 16 will perceive the light field shifting to provide an accurate perspective of the light field from the new position. The shifting in perspective, herein referred to as motion parallax, demonstrates the natural relationship between elements in a light field and how that relationship changes as the viewing angle changes. Motion parallax mimics the physical world scene, presenting the light field as if the viewer at the viewing location 16 was present in the physical world scene. Allowing a viewer's eye at the viewing location 16 to perceive the light field as naturally as if they were present in the physical world scene provides numerous applications for 3D light field displays where two-dimensional displays fail.

Light Field Displays discretize light rays to approximate the light field, and the number of rays used, or the directional resolution, and the density with which the rays are packed affect the depth of the display. The density of rays can be measured using the hogel pitch, which is the distance between the center of two adjacent hogels. The maximum depth beyond which objects appear blurry can be calculated using the directional resolution (N×N), the hogel pitch (HP), and the field of view (F) as follows:

$$\text{Max } DoF = \frac{N * HP}{\tan\left(\frac{F}{2}\right)}$$

Rendering a light field requires capturing each of the source images from individual views and stitching them together to form the entire light field. To do this, first, a packing algorithm takes as input the LFD configuration and a set of rendering parameters before generating a data structure containing all the required information for rendering every view, and every view must then be iterated over and captured. The light field resolution describes the total number of pixels in the light field and is calculated as the product of directional resolution and spatial resolution using the below equation.

Light Field Resolution=Directional·$X$*Directional·$Y$*Spatial·$X$*Spatial·$Y$ where:
Directional. X is the directional resolution along the x axis of the light field
Directional. Y is the directional resolution along the y axis of the light field
Spatial. X is the spatial resolution along the x axis of the light field
Spatial. Y is the spatial resolution along the y axis of the light field If the light field resolution exceeds the maximum frame size supported, the light field can be partitioned into subframes, where each subframe contains a portion of the total views. All views in a subframe are rendered, and then exported to memory. Finally, the subframes are composited using a compositing function to generate the complete light field.

Figure 5:
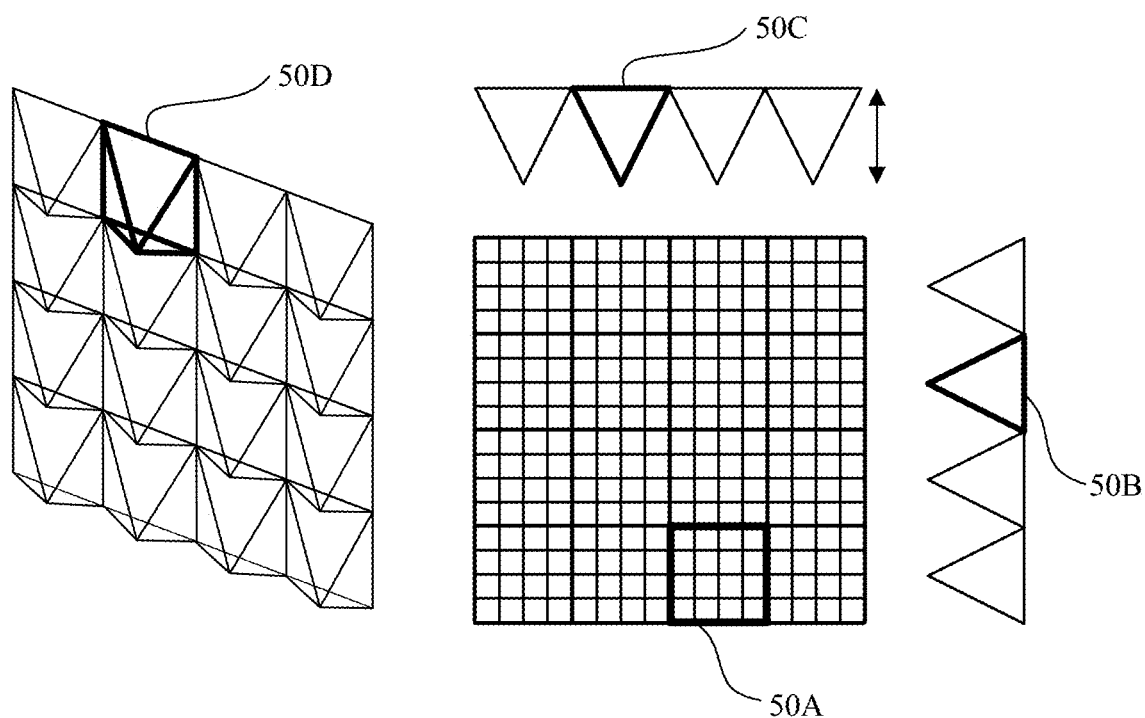
FIG. 5 is an illustration of frustum views for a 4×4 hogel spatial resolution light field.

FIG. 5 is an illustration of frustum views for a 4×4 spatial resolution light field. The front view of the hogel grid 50A, side view of the hogel grid 50B, top view of the hogel grid 50C and isometric view of the hogel grid 50D are shown for demonstration, although it should be noted that each view is preferably captured serially, rather than in parallel. The combination of every frustum view forms the light field frustum. The general method of rendering light fields using frustum projections at the display plane does not allow for capturing objects in the outer frustum. In particular, when a camera is placed at the display plane any light field information behind the camera in the outer frustum volume cannot be captured by the camera. Traditionally, capturing light field data in both the inner frustum volume and outer frustum volume has been a cumbersome undertaking. The method, as per the present disclosure, describes a light field shifting scheme, herein referred to as light field offset, to capture the light field at a retraction plane and then shift the light field back to the display plane after capturing all the frustum views. The present method can be easily implemented by shifting the image capturing to an offset distance from the display plane away from the inner frustum volume. This method enables 3D light field scene capture of the outer frustum volume as well as more complete 3D light field scene capture of the inner frustum volume. Additionally, performing this light field offset with rendering does not require engine modification.

Figure 6A:
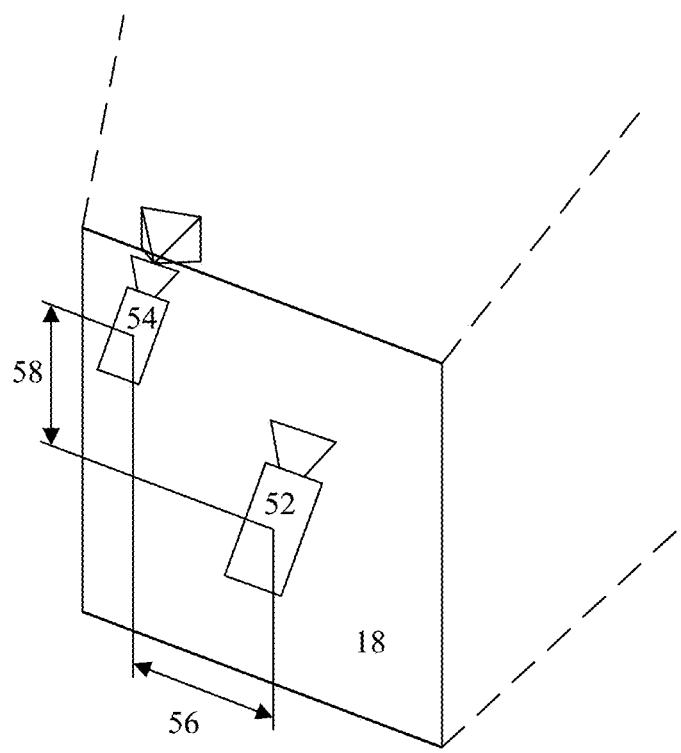
FIG. 6A illustrates a hogel camera translation in a 3D view.
Figure 6B:
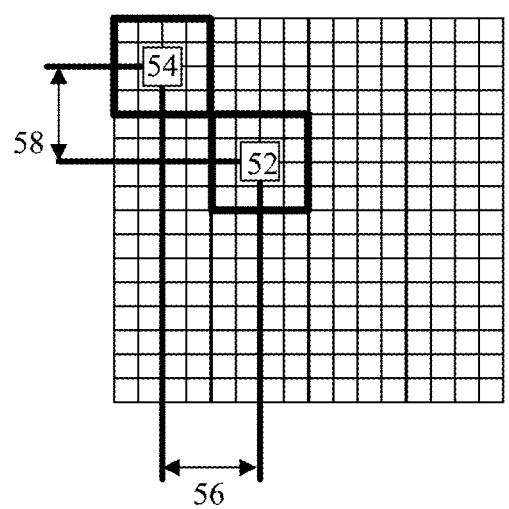
FIG. 6B illustrates a hogel camera translation in a grid view.

FIG. 6A illustrates a hogel camera translation in a 3D view and FIG. 6B illustrates a hogel camera translation in a grid view. As illustrated in FIG. 6A and FIG. 6B, the packing algorithm defines a light field camera 52 at the center of the display plane 18 to aid with rendering calculations. Only a single light field camera 52 is shown for illustration purposes, however it is understood that a plurality of light field cameras in a camera array can also be used to capture the 3D scene in greater detail and at a plurality of locations. For each light field camera view, the position of the viewport of an associated hogel camera is defined by an x direction offset 56 and y direction offset 58 from the light field camera 52. A light field camera 52 can be a physical camera or a computer-generated camera, and the hogel camera 54 can be understood as a virtual representation of a camera view with an x,y offset relative to the light field camera 52 on the camera plane. The view information also contains the location in the subframe to write the rendered elemental image for display at the display plane of the LFD. A hogel camera 54 is defined and configured, representing the viewport for an elemental image at the hogel camera position. The position of a plurality of hogel cameras 54 shifted in the x and y directions around the display plane 18 can be achieved using these offsets, rendering every view in the subframe onto the subframe texture at the x,y locations specified in the rendering information. An isometric view of the x direction offset 56 and y direction offset 58 from the light field camera 52 to each hogel camera 54, also known as the hogel camera translation, at the display plane 18 is illustrated in FIG. 6A. The front view of the x direction offset 56 and y direction offset 58 from the light field camera 52 to the example hogel camera 54 at the display plane 18 of a light field with a spatial resolution of 4×4 is illustrated in FIG. 6B.

Figure 7A:
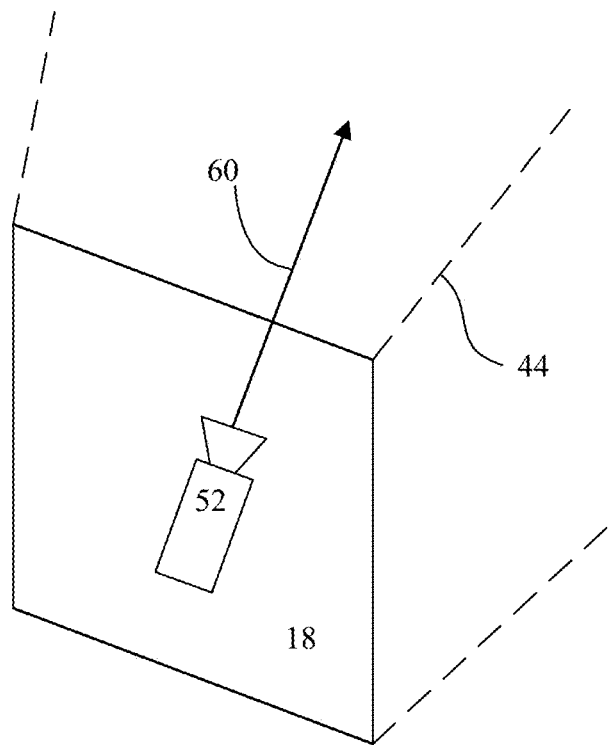
FIG. 7A illustrates a light field camera at a display plane and the light field camera's forward vector.

FIG. 7A illustrates a light field camera 52 positioned at a display plane 18 and the light field camera's forward vector 60. When the light field camera 52 is positioned at the display plane 18 only light field information in the inner frustum volume 44 is received by the camera.

Figure 7B:
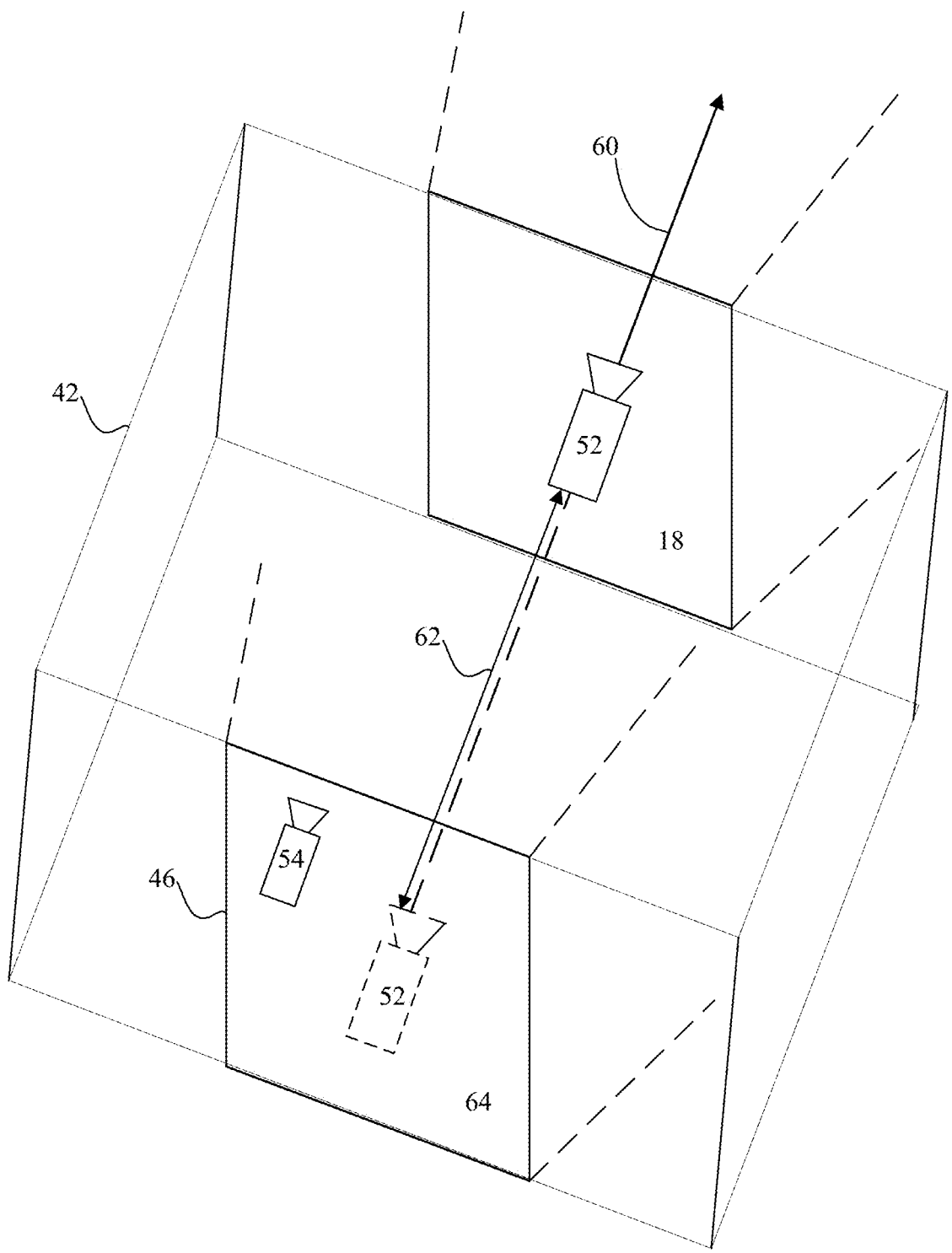
FIG. 7B illustrates a light field camera retracted an offset distance from the display plane.

FIG. 7B illustrates a light field camera 52 retracted an offset distance from the display plane 18 and positioned at a retraction plane 64. Instead of capturing the scene from the display plane 18, the light field camera 52 can be retracted to a retraction plane 64 at a certain distance, or offset distance 62, from the display plane 18, to capture objects in the outer frustum volume 42. It is noted the outer frustum volume 42 is shown as a block of space for illustrative purposes only. To apply this shift, the light field camera 52 is translated backwards along the trajectory of its forward vector 60. In contrast to the camera translation method described in FIG. 6A/B, the light field camera 52 is retracted an offset distance 62 to the retraction plane 64 from the display plane 18, before one or more hogel cameras 54 are defined and configured. The hogel camera 54 is generated by applying a decoding scheme to the light field camera 52, where the decoding scheme decodes the source image at the light field camera and offsets this decoded source image comprising an elemental image by the translational shift of the light field camera 52 to the hogel camera 54 to create a virtual or synthesized image at the location of the hogel camera 54. When the x and y offsets from the light field camera 52 are applied to the hogel camera 54, as illustrated in FIGS. 6A/B, the hogel camera 54 is translated on a retraction plane 64 that is behind the display plane at the retraction plane 64, which in this case is also at the near clip plane 46. In other words, for this embodiment, the near clip plane 46 is the retraction plane 64, but it should be noted that this does not need to be the case. The retraction plane 64 may also be positioned anywhere along the trajectory of the forward vector 60, within the outer frustrum volume 42 of the light field display at an integral distance from the display plane 18.

After the light field camera 52 captures the frustum views from the retraction plane 64 and generates a light field, a pixel remapping function is used to shift the light field from the retraction plane 64 back to the display plane 18. The offset distance D 62, for directional resolution N×N, and for all integer values of shift factor alpha, can be calculated as:

$$D=\alpha*N*\text{Focal Length}$$

The same pixel remapping can be done for every light field camera 52 and every hogel camera 54 to create an integral light field image at the display plane 18. It can be shown that each pixel in the display plane can simply be offset an integer number of hogels to shift the light field towards or away from the camera.

It is noted that the disclosed rendering method can be used for a computer-generated light field image. In this embodiment, a computer-generated light field image comprise one or more elemental images, thereby eliminating the decoding of the source image.

Figure 8:
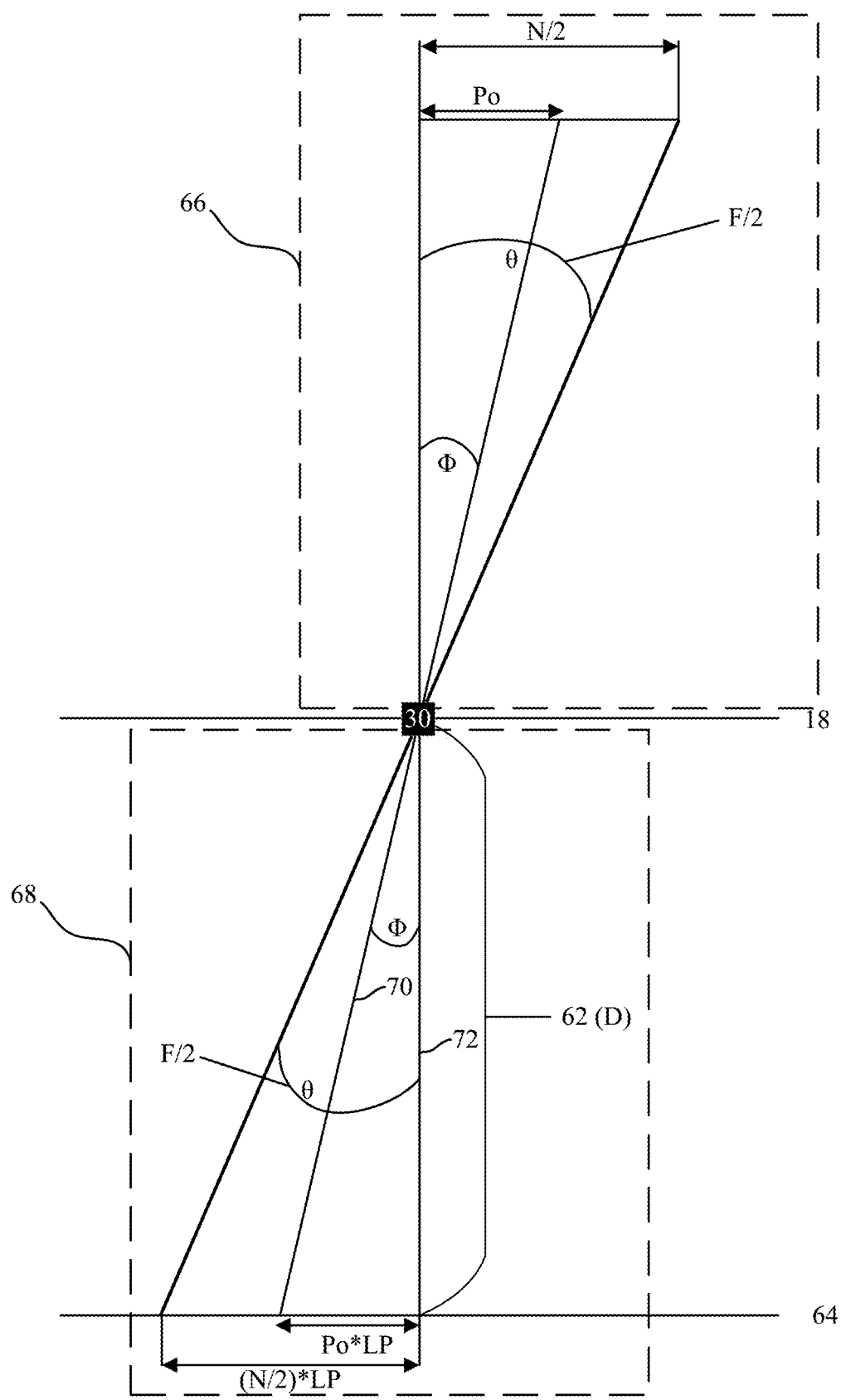
FIG. 8 illustrates the relationship between pixels in the light field at the display plane and pixels in the light field at an offset distance.

FIG. 8 describes the relationship between pixels in the light field at the display plane 18 and pixels in the light field in the retraction plane 64 at the offset distance 62 (D). For simplicity, the figure is two dimensional (along the x-z plane) and focuses on a single hogel 30 at the display plane 18, however it is noted that the relationship is identical in the z-y plane as well as for every hogel. The relationship is based on the pixel index ($P_o$) which is the index of the pixel within the hogel 30. A hogel view at the display plane 18 is illustrated by box 66, while a hogel view at the offset distance 62 (D) at the retraction plane, is illustrated by box 68. The angle theta, θ, is defined as FOV/2 (F/2), and the angle phi, Φ, is the angle between the ray corresponding to any pixel 70 in the hogel 30 and the center line 72 of the hogel 30 normal to the display plane 18. As illustrated, F/2 (angle theta, θ) in the outer frustum volume represented by box 68 combined with F/2 (angle theta, θ) in the inner frustum within box 66 equals the full field of view for the light field display. The ray represented by one pixel 70 is cast from the display plane 18 back to the retraction plane 64, which is parallel to the display plane 18 and retracted by the offset distance 62. Using similar triangle geometry, the tan function, and the formula relating lens pitch to focal length, it is shown that when the offset distance is defined by: D=α*N*Focal Length, each pixel 70 is shifted an integer multiple of the lens pitch based on the pixel index. The lens pitch is the distance between adjacent hogels, therefore an offset of N multiplied by the lens pitch will simply shift the pixel N hogels. The direction of the shift is dependent on whether the ray is in the first or second half of the hogel 30.

Offset distance D 62 as a function of the focal length of the display and integer N is derived by:

1. $\tan\dfrac{F}{2} = \dfrac{\left(\dfrac{N}{2}\right)}{d}$

2. $d = \dfrac{\left(\dfrac{N}{2}\right)}{\tan\left(\dfrac{F}{2}\right)}$

3. $\tan\phi = \dfrac{P_o}{d} = \dfrac{P_o \times LP}{D}$

Where lens pitch is defined as: $LP = 2\tan\left(\dfrac{F}{2}\right) \times FL$

Solving equation 3 for $D$ gives: $D = LP \times d$

Substituting equation 2 for $d$ gives: $D = \dfrac{LP \times \dfrac{N}{2}}{\tan\left(\dfrac{F}{2}\right)}$ Resulting in: $D = FL \times N$ Pixel indexing, a known step in image processing, describes how images are indexed to identify all pixels within the image. The notation ($P_x$, $P_y$) is the how computer software identifies each pixel. Once the image is indexed, the computer software can manipulate the image information, which alters the image. In an example the computer software can render, transmit, store, alter the color, alter the transparency, etc. The indexing methodology of a 2D image can be applied to light field images via providing indices for the hogels as well as the pixels. The notation LF[$H_x$, $H_y$, $P_x$, $P_y$] is the 3D identification of each hogel and pixel in the light field image.

Double frustum light field rendering using frustum projections and light field offset has been implemented as a UE4 plugin. A light field frustum can be placed in a scene and configured as desired before rendering. Once the render is triggered, the technique described herein is employed to capture the light field. After the light field is captured from the retracted position using frustum projections, the entire light field is saved in memory. Then, a second light field buffer is created to perform the remapping. This results in a very large memory overhead that can be solved using a "scanning" method that applies the remapping on the fly as opposed to after the image is fully captured.

Based on the relationship between pixels in the light field at the display plane 18 and the light field at the retraction plane 64, a simple mapping can be applied to the captured light field to shift it towards the camera. The remapping algorithm iterates over each pixel in each hogel in the light field image buffer, and offsets each pixel by "N" hogels based on its pixel index $P_o$. To offset the pixel by a full hogel, the spatial index is increased by one. After calculating the offset, the pixel is stored in the determined target location in the remapped buffer. After all the pixels are remapped, the remapped light field is exported.

One of the most important engine features that the disclosed rendering technique must support is lighting. Gaming engines, such as UE4, have three general types of lighting: static lighting, dynamic lighting, and stationary lighting. Each type of lighting is used by designers in different scenarios and all types should be fully supported. Physically Based Rendering (PBR), uses programs to recreate the interactions of materials, such as metals, glass, and mirrors, with light. UE4 widely uses PBR materials to create realistic scenes and the disclosed rendering method correctly supports PBR. To test this support with the presently described method and system, scenes with various PBR materials were rendered and all PBR materials tested were successfully captured. PBR material tests include: roughness, metallic, specular and translucency.

To further advance the disclosed rendering method, a light field camera can be decoded to an array of hogel cameras using multi-view depth image-based rendering. This technique can be described as the rendering of synthetic images using multiple views. 3D image warping can further be used to synthesize virtual views. Depth image-based rendering is a decoding method that converts images with image information, including color and depth, to index-based geometry, then performs a known 3D rendering method. Specifically, depth image-based rendering takes a 3D scene and its associated depth information, and the index of each pixel in scene. The depth information provides the depth for each pixel and the index provides a location of the pixel in the 3D space. Depth image-based rendering finalizes the rendering operation by projecting these points on an image plane, which could be the retraction plane or the display plane, producing an array of hogel cameras with the same optical properties as hogels and a geometrically correct elemental image for each hogel camera. After decoding, each hogel has a hogel camera with an elemental image and the array of hogel cameras collectively comprise an integral image for the array of hogels to emit. The integral image is a light field image that can now be displayed on a light field display.

Reprojecting color-plus-depth images is a decoding method that uses a light field camera and its forward vector direction. Using a pixel's depth information and indices, particularly the x-index, and y-index, the pixel's coordinates in 3D space (x, y, z) can be calculated. This pixel in 3D space can be converted to a depth, x-index, and y-index for a single hogel, and its associated elemental image, using the hogel's origin and forward direction. With the decoded x-index and y-index, the pixel can be written to the elemental image on an image plane, including but not limited to the retraction plane or the display plane. The reprojecting color-plus-depth images decoding method is repeated until all hogels are populated with pixels written to each hogel's elemental image. Collectively, the array of hogel cameras comprise the integral image. After an array of cameras at the retraction plane is decoded, the integral image at the display plane can be constructed by reindexing the decoded integral image at the retraction plane. The integral image is a light field that can then be displayed on a light field display.

As methods to decode light field images advance, fewer light field cameras are needed to capture the scene that is decoded to generate a cohesive light field. One advantage to using fewer light field cameras is that there is less data to be rendered, and data is transmitted at a faster rendering rate, resulting in a higher frames per second (fps) rate. Accordingly, limiting the number of light field cameras required to capture a 3D description of a scene is highly desirable. In known light field image capture, light field cameras, are aligned on a display plane. Light field cameras can be physical cameras such as pinhole cameras, digital single lens and reflex mirror cameras (DSLR), plenoptic cameras, compact cameras, mirrorless cameras, or computer-generated cameras. Each light field camera captures a view from a specific point in space and generally can only capture volume in front of the light field.

Figure 9:
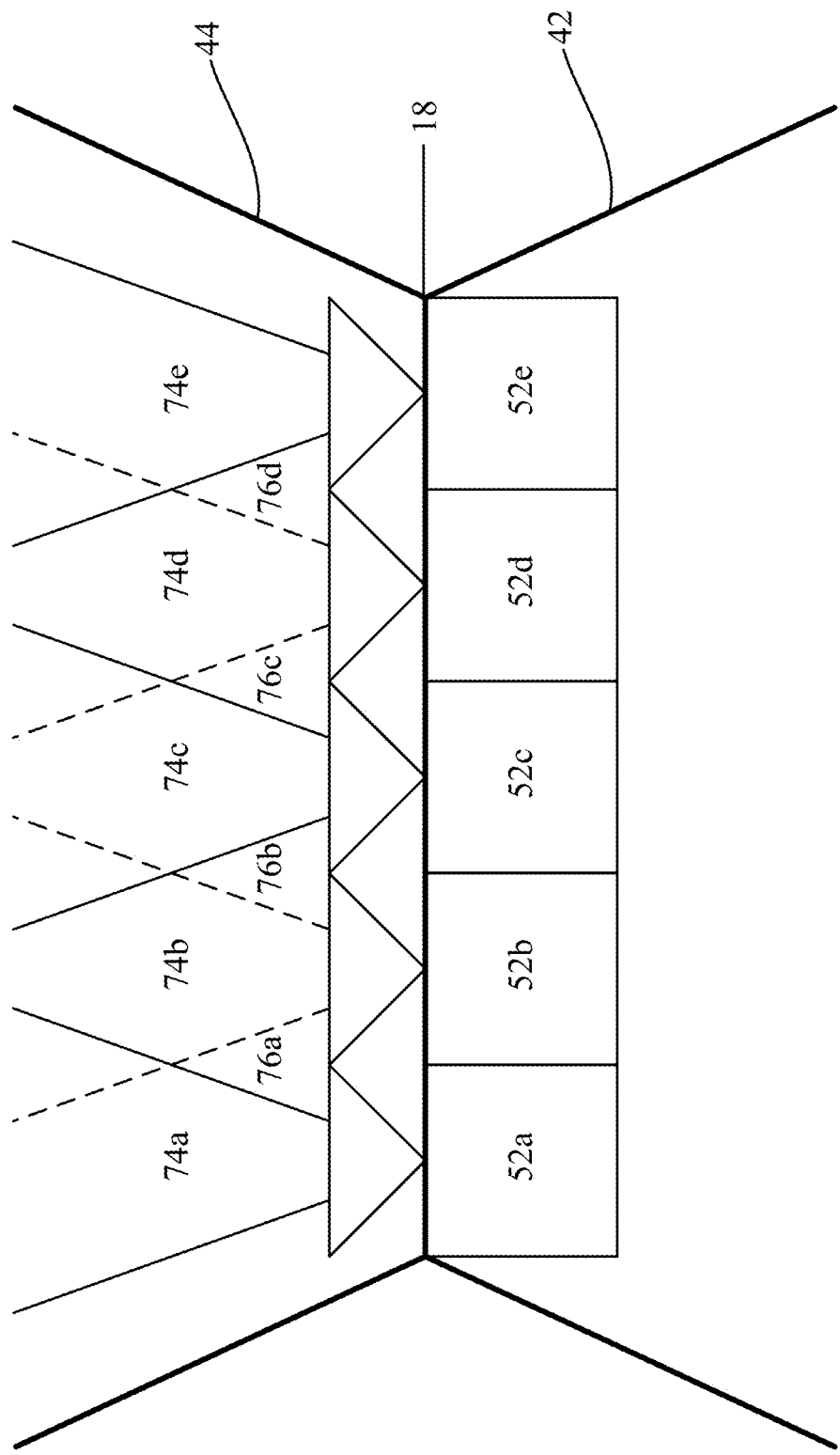
FIG. 9 illustrates a light field camera array positioned at the display plane showing volumes that are captured as well as volumes that are not captured.

FIG. 9 illustrates a simplified diagram depicting a light field capture technique with a light field camera array positioned at the display plane showing light field volumes that are captured by the light field cameras as well as volumes that are not captured, referred to herein as "blind volumes" or "blind volume regions". As shown, an array of light field cameras 52a, 52b, 52c, 52d, 52e are positioned at a display plane 18, and the frustum volumes 74a, 74b, 74c, 74d, 74e, are captured by each of light field camera 52a, 52b, 52c, 52d, 52e, respectively, in the inner frustum volume 44 of a light field. Although shown as a line of light field cameras 52a, 52b, 52c, 52d, 52e, it is understood that a plurality of light field cameras organized in an array along an x, y plane is generally used to capture a light field. The present two dimensional representation is shown here for simplicity. It is noted that the size and shape of the frustum volume captured by each camera depends on the type of light field camera used to capture the light field source image, which includes its lenses and optical properties. As shown here, known light field image capture techniques do not capture images behind the display plane 18 in the outer frustum volume 42 of the light field.

Physical cameras when used as light field cameras are further limited by the size and number needed to generate a cohesive light field image. Light fields are comprised of an array of hogels, and each hogel has a diameter that can be, for example, 0.1-25 mm. To capture an image for every hogel in the light field display would result in a required range of 100 to 100,000 captured images from a physical camera. It is possible to control the scene to capture this many images with a plurality of physical light field cameras, however a controlled scene limits the type of content that can be captured. In particular, it is challenging to create an array of physical light field cameras that are small enough and patterned densely enough to capture a complete light field image of a non-controlled scene without any sparse sampling artifacts, where sparse sampling artifacts are regions in the image where the light field cameras are not capable of capturing an image. FIG. 9 illustrates the instance where there is limited or no overlap between, for example, the frustum volume 74a of one light field camera 52a and the frustum volume 74b of an adjacent light field camera 52b in the camera array, creating a blind volume region 76a, where no image can be captured. In a camera array positioned at the display plane 18 as shown, a plurality of blind volume regions 76a, 76b, 76c, 76d are present in the region where there is no light field capture by the cameras in the array. Although the figure is shown in cross-section it is understood that cameras in a camera array would generally regularly spaced throughout the 2D display plane 18 and that the blind volumes would therefore be spread throughout the display plane 18. Sparse sampling artifacts present as black regions on a display are the result of these blind volume regions as there is no image information to deliver to the pixel, and as a result the pixel will be black or remain off.

Figure 10:
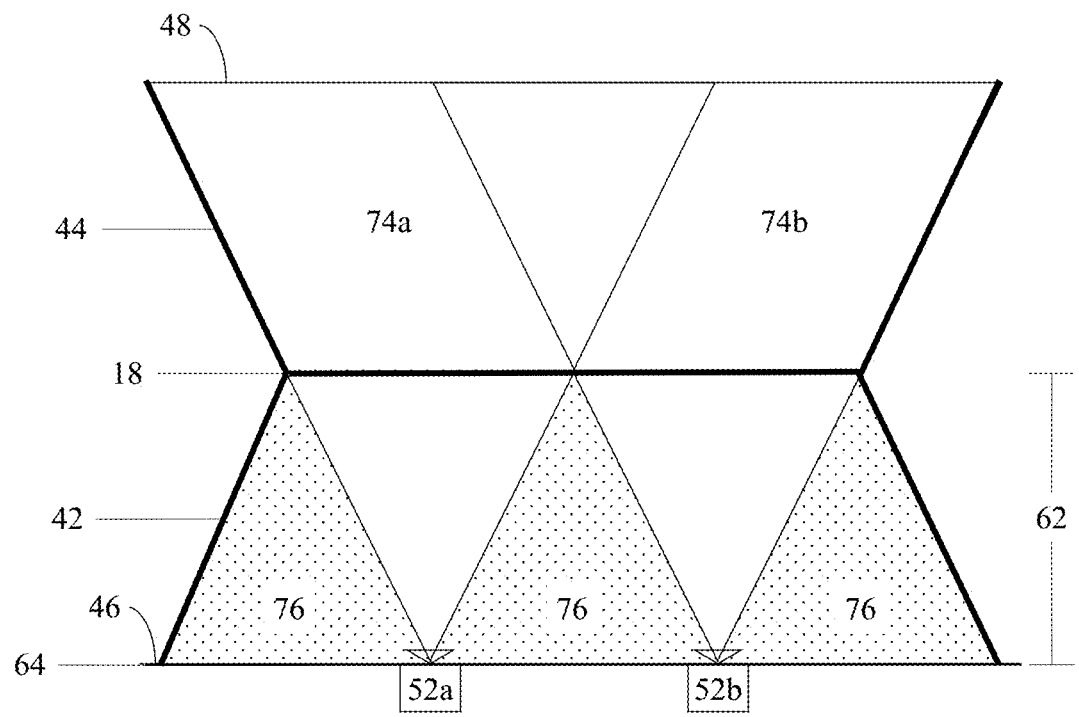
FIG. 10 illustrates a light field capture method that offsets a light field camera array to a retraction plane, allowing the inner frustum volume to be captured.

FIG. 10 illustrates a light field capture method that offsets the light field cameras 52a, 52b in a camera array away from the display plane 18 to a retraction plane 64, allowing the entire inner frustum volume 44 to be captured by the light field camera array by way of increasing overlap of the individual camera frustum volumes 74a, 74b, respectively. Two light field cameras 52a, 52b are shown for simplicity, however it is understood that a camera array in accordance with the present disclosure comprises a plurality of cameras spaced in a 2D array in the x, y plane of the camera array, which, as shown here, is the retraction plane 64. In order to increase the overlap of the individual camera frustum volumes 74a, 74b, the retraction plane 64 is retracted at a perpendicular integral offset distance 62 from the display plane 18 within the outer frustum volume 42 of the light field. The retraction plane 64 can lie at, for example, outside or inside the near clip plane 46. At the retraction plane 64 is an array of light field cameras positioned such that each light field camera has the same offset distance 62 to the display plane 18 and where the light field cameras are positioned at a sample gap relative to one another. As previously described, the number of light field cameras used to capture the 3D scene and render the light field can be reduced to the minimum number required based on the sample gap calculation. However, it is understood that camera arrays for producing complex and high-quality light field displays generally comprise more than two cameras.

The disclosed method of capturing the outer frustum volume 42 comprises moving the light field cameras 52a, 52b to the retraction plane 64 and rendering in the forward direction, as described herein. This method is contrasted with the less advantageous method of setting the near clip plane 46 and far clip plane 48 to negative values and placing the light field cameras 52a, 52b on the display plane 18. The latter method will not capture the full outer frustum 42 volume unless every hogel is rendered, which defeats the purpose of encoding. Retracting the light field cameras 52a, 52b to the retraction plane 64 allows for the capture of the entire scene in both the inner frustum volume 44 and outer frustum volume 42. Compositing the captured images to a display plane alters the image to appear as if the image was taken at the display plane and allows the image to present the inner frustum volume 42 and the outer frustum volume 44. Once composited, the focal point of the scene is at the display plane 18, providing an immersive experience for the viewer.

The placement and number of light field cameras 52a, 52b on the retraction plane 64, as well as the number of these cameras used for any particular image capture, is designed based on the limitations and processing capabilities of the system. As previously described, the number of light field cameras 52 used to capture the 3D scene can be reduced to the minimum number required based on the sample gap calculation. The placement and number of light field cameras 52 in the camera array can provide a large enough area to capture the entire intended light field volume intended frustum, i.e., the inner frustum volume 44 and/or the outer frustum volume 42. It is an object of the disclosed rendering method to calculate the required number of light field cameras 52 from the retraction plane 64. In this embodiment wherein the frustum intended for capture is the inner frustum volume 44. Retracting the light field cameras 52a, 52b to the retraction plane 64 allows the individual camera frustum volumes 74a, 74b of light field cameras 52a, 52b, respectively, to capture the entirety of the inner frustum volume 44 with blind volumes 76 only present in the outer frustum volume 42. It is noted that although two light field cameras 52a, 52b are illustrated for this embodiment, any number of light field cameras may be employed, and at any desired 2D orientation, such as in a square, rectangular, hexagonal, trigonal, or any other reasonable orientation.

In an example, in a three-dimensional embodiment, at an integral offset distance of N=1, a plane of four light field cameras may lie on the retraction plane 64 to capture an inner frustum volume 44 of a light field for a LFD. In another example at an offset distance of N=2, a plane of nine light field cameras 52a, 52b may lie on the retraction plane 64 to capture the outer frustum volume 42 of a light field display. Conventional methods to capture light field images with physical light field cameras require a range of 100 to 100,000 source images to be captured. Comparatively, this method can create a light field image of the physical world with 4 source images (using a 2×2 light field camera array). It should be noted that a 2×2 light field camera array would only represent the inner frustum volume 44, which is still considered a valid light field image. To capture the outer frustum volume 42, nine source images are needed (i.e. a minimum of a 3×3 light field cameras in the camera array). This reduction in the number of light field cameras required to capture the 3D scene further reduces the amount of data required to be transmitted and processed and increases the feasibility of capturing physical images for light field displays. For comparison, employing the disclosed method using a 3×3 light field camera array, resulting in 9 source images, compared to a traditional capture method with a minimum of 100 source images produces a decreased dataset to be rendered, thereby increasing rendering efficiency of the same 3D scene by 91%.

The dimensions of the retraction plane 64 are derived from the spatial resolution and directional resolution of the light field display and the selected integral offset parameter, N.

Therefore:

$$\text{Retraction Plane} = [SR_x + (DR_x*(N-2)), SR_y + (DR_y*(N-2)), DR_x, DR_y]$$

where:

$SR_x$ is the spatial resolution, or number of hogels, in the display in the x-axis $SR_y$ is the spatial resolution, or number of hogels, in the display in the y-axis $DR_x$ is the directional resolution, or number of pixels, in each hogel in the x-axis $DR_y$ is the directional resolution, or number of pixels, in each hogel in the y-axis N is the integer offset or the number of retractions from the display plane The retraction plane 64 has an offset distance 62 from the display plane 18 equal to an integer multiple of the focal length multiplied by the directional resolution. Light field displays commonly set the inner frustum volume 44 and outer frustum volume 42 to equal the focal length of the light field cameras capturing the light field, which equals the focal length of the display multiplied by the directional resolution. At this volume, the pixel pitch will equal the hogel pitch creating a high-quality image and the retraction plane 64 lies on the near clip plane 46. As the inner frustum volume 44 and the outer frustum volume 42 increases to be larger than the focal length of the light field cameras multiplied by the directional resolution, the sampling rate limits the image quality at the near clip plane 46 and far clip plane 48. Light field displays do not have to conform to a particular size to prove useful. If the inner frustum volume 44 and outer frustum volume 42 of the LFD are not based on focal length and directional resolution, the retraction plane 64 may not lie at the near clip plane 46.

In the present method, the retraction plane 64 has an offset distance 62 from the display plane 18 that is determined by the properties of the light field display, which are designed to accommodate and optimize the optical properties of the light field cameras 52a, 52b.

Therefore:

$$\text{Offset Distance} = N(f \ast DR)$$

where:
f is the focal length of the display
DR is the directional resolution of the display plane
N is the integer offset from the display plane As the offset distance 62 is calculated from the focal length and directional resolution of the light field cameras 52a, 52b, the directional resolution of the light field cameras will be the same as the directional resolution of the display plane 18. All of the light field cameras 52 in the camera array should have the same optical properties, including but not limited to orientation lens pitch, directional resolution, and field of view, to enable the offset distance 62 of the camera array at the retraction plane 64 to the camera array at the display plane while retaining all of the inner frustum volume 44 in the field of view of the light field cameras 52a, 52b.

At any particular distance, rays traced from camera pixels in the retraction plane 64 will intersect the display plane 18 such that the distance between pixels, or pixel pitch, at the display plane 18 equals the pixel pitch at the retraction plane 64. Therefore, pixels at the display plane 18 and pixels at the retraction plane 64 will have the same resolution and lens pitch, a condition required to implement the pixel remapping function. The term "same resolution" refers to the directional resolution of pixels at the display plane 18 in a LFD. The condition that pixels at the display plane 18 have the same directional resolution as pixels at the retraction plane 64 is required in all circumstances because the pixel remapping function only changes the hogel index ($H_x$, $H_y$), and the directional pixel index ($P_x$, $P_y$) does not change during remapping. Additionally, the condition that pixels at the display plane 18 have the same lens pitch as pixels at the retraction plane 64 is required in all circumstances is because the remapping function is implemented by offsetting the retraction plane 64 a particular distance (offset distance 62) where the pixel pitch matches the lens pitch of each pixel in both the display plane 18 and the retraction plane 64.

The challenges that arise when capturing and displaying physical light field images have previously inhibited the use of light field images that have been captured of the physical world on light field displays. In particular, it is very challenging to capture the inner frustum volume 44 and outer frustum volume 42 from a real-world light field due to the sparse sampling artifacts created by the absence of frustum volume overlap of the light field cameras. The present method and system solves this problem by offsetting the camera array to a retraction plane 64 and using a rendering, decoding, and reindexing method to regenerate the light field image captured by the camera array to generate a light field image at the display plane 18.

Figure 11:
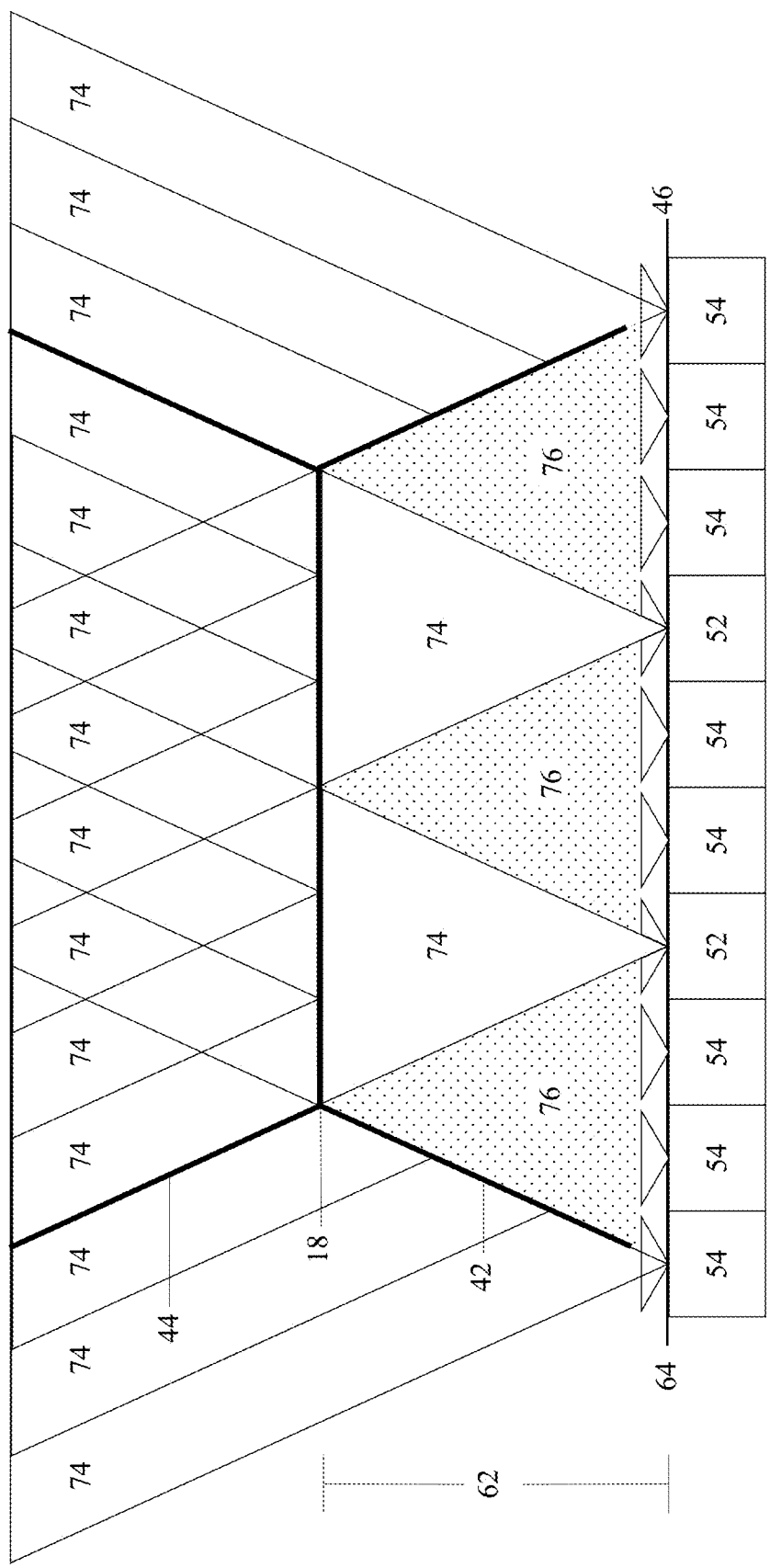
FIG. 11 illustrates an embodiment of the disclosed method with an offset parameter of N=1.

FIG. 11 illustrates an embodiment of the disclosed method with an offset parameter of N=1. The retraction plane 64 may be offset from the display plane 18 by an offset distance 62 (N), where N is any integer. The embodiment shown illustrates a retraction plane 64 offset by N=1, which is the smallest possible offset from the display plane 18. It is understood that for N=0, the retraction plane 64 lies on the same plane as the display plane 18. At N=1, the retraction plane 64 lies on the near clip plane 46 where the outer frustum volume 42 is determined by the focal length and the directional resolution of the display. Otherwise, at N=1, the retraction plane 64 does not lie on the near clip plane 46. At N=2, N=3, and additional offset distances where N>1, the retraction plane 64 lies outside the outer frustum volume 42 and near clip plane 46.

Once the plurality of light field cameras 52 in the camera array have captured the light field at the retraction plane 64, depth image-based rendering finalizes the rendering operation by projecting the captured light field data onto an image plane. In the rendering method, a plurality of hogel cameras 54 are generated with the same optical properties as hogels with a geometrically correct elemental image for each hogel camera 54 based on the position of the hogel relative to the light field cameras 52 in the camera array. After decoding, a hogel camera 54 with an associated elemental image is generated and the plurality of elemental images generated by the plurality of hogel cameras 54 together with the plurality of elemental images generated by the plurality of light field cameras 52 will collectively comprise an integral image for the light field. The integral image is the light field image that can be displayed on a light field display. As shown, each hogel at the retraction plane is rendered with 2D (x, y) geometric adjustment to provide the elemental image for each hogel at the display plane to emit in an LFD.

Reprojecting color-plus-depth images is a decoding method that uses a light field camera 52 and its forward vector direction. Using a pixel's depth information and indices, particularly the x-index, and y-index, the pixel's coordinates in 3D space (x, y, z) can be calculated. This pixel in 3D space can be converted to a depth, x-index, and y-index for a single hogel, and its associated elemental image, using the hogel's origin and forward direction. With the decoded x-index and y-index, the pixel can be written to the elemental image on an image plane, including but not limited to the retraction plane 64 or the display plane 18. The pixel remapping function consists of repeating the reprojecting color-plus-depth images decoding method until all hogels are populated with pixels written to each hogel's elemental image.

One solution to the physical limitation of conventional light field capture techniques is an additional advantage of the disclosed light field rending method to decode one or more light field cameras 52 by generating hogel cameras 54 in a hogel camera array in the same plane as the light field camera array and synthesizing the hogel camera array to produce a cohesive integral image. After capture, the 3D scene data can be processed to include image information, including but not limited to color, transparency, and depth information. Pixel indexing, also referred to as pixel remapping, provides a location for each pixel which allows the computer software to identify each individual pixel and the image information associated with each pixel. The identification of the pixel location and its image information allows computer software to modify and process the image such that pixel information in the hogel cameras at the retraction plane 64 can be remapped to pixel information in hogels at the display plane 18. Hogel cameras 54 can be generated by decoding methods such as depth image-based rendering, reprojecting color-plus-depth images, etc., to provide image information to all pixels in the LFD.

Decoding methods, such as depth image-based rendering, reprojecting color-plus-depth images, etc., generates a hogel camera 54 for each single hogel, where each hogel camera has an associated elemental image related to the hogel location in the light field. In other words, decoding generates the elemental images from the source image as captured by each light field camera. Decoding methods can create small enough hogel cameras 54 that, when patterned densely enough, create the integral image while providing a very high density integral image for display on the LFD. As per the present disclosure, the input to decoding in this context, is the sparse array of light field cameras 52. What makes the array sparse is the usage of the Sample Gap, which provides the distance or spacing between light field cameras 52 in the camera array required to obtain a light field image, with the use of interstitial generated or synthesized hogel cameras 54 positioned between the light field cameras 52 on the same x,y plane. In one example, to use the sparse array of light field cameras 52 to create an integral light field, the plurality of light field cameras 52 are decoded as the full array of hogel cameras 54 in the same plane with geometric adjustment for the location of each hogel camera 54. In an example, the decoding process first decodes the sparsely spaced array of light field cameras vertically. After this step, the height of the integral image matches the height of the decoded integral image. The second step is to decode the integral image horizontally. After the second step the integral image is the decoded integral image with the correct height and width. Taking advantage of the sample gap results in fewer light field cameras 52 needing to be decoded to produce a full array of hogel cameras 54 and provide a complete integral image at the camera plane.

The disclosed rendering method has been described in terms of a single light field camera 52 and a single hogel camera 54 for simplicity. Naturally, it is understood that a light field camera 52 array comprising a plurality of light field cameras 52 will generate a hogel camera 54 array comprising a plurality of hogel cameras 54. The number of light field cameras 52 required to capture the 3D scene data is determined by a sample gap calculation, which is defined by the coding and decoding scheme. The sample gap determines the maximum distance between two light field cameras 52 in a camera array sufficient to provide the light field data between the light field cameras 52 and generate the hogel camera 54 array.

Therefore:

Sample Gap=$l*DR$ where:

l is the lens pitch of the light field camera

DR is the directional resolution of the display plane

After decoding, there will be one hogel camera 54 for every hogel in the LFD, and the hogel cameras 54 will share the same optical properties as their hogel. Each hogel camera 54 is generated to comprise the elemental image and its associated hogel will be remapped to emit the elemental image at the LFD. The set of hogel cameras 54 together with the light field cameras 52 creates an integral image, where the integral image is comprised of a plurality of elemental images. Each elemental image is associated with a single hogel, and the collection of hogels is required to create a light field at the LFD. A hogel may be defined as the light engine that produces light. Each hogel has a field of view, a 2D resolution, an (x,y,z) position in space (origin), and forward direction. After decoding, the hogel camera pitch, which is the distance between the centre of two adjacent hogel cameras 54 on the retraction plane 64, is equal to the lens pitch of the light field display. The blind volume 76 resides only in the outer frustum volume 42. At this stage, the hogel cameras 54 are synthesized with their hogel, which entails decoding to provide an elemental image. All of the hogel cameras 54 are aligned on a uniform grid, are coplanar, and have the same position and optical properties, including but not limited to orientation, lens pitch, directional resolution, and field of view, as their hogel. Once the hogel cameras 54 are synthesized with their hogel, the prerequisites for implementing the pixel remapping technique are satisfied.

Figure 12:
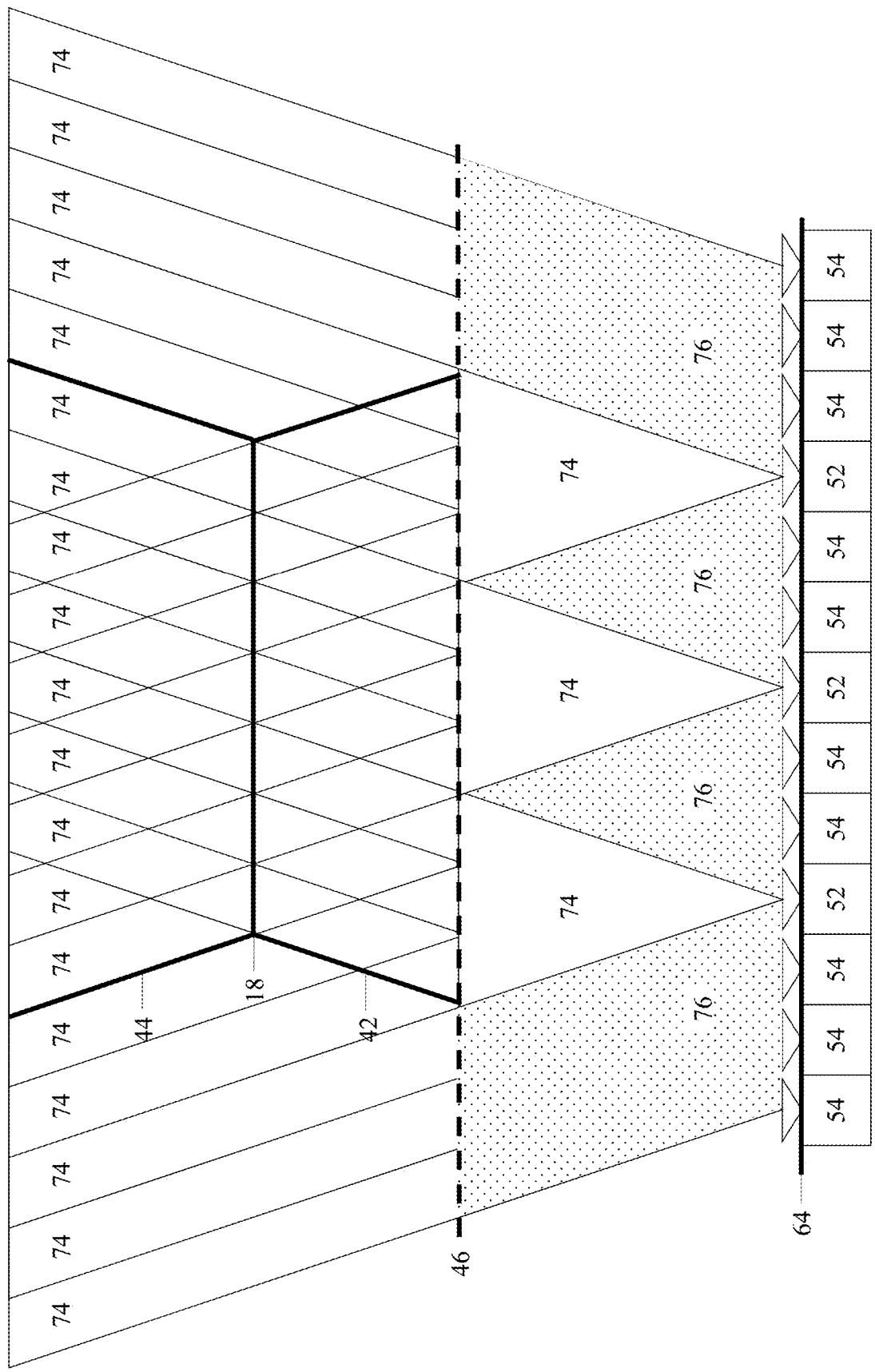
FIG. 12 illustrates an embodiment of the disclosed method with an offset parameter of N=2.

FIG. 12 illustrates an embodiment of the present disclosure wherein the retraction plane 64 is calculated using an offset parameter of N=2 from the display plane 18. In the 3D embodiment of this illustration, the frustum volumes 74 are captured by nine light field cameras 52 arranged on an x, y grid at the retraction plane 64. As FIG. 12 is a 2D illustration of a 3D embodiment, three light field 52 cameras are shown, however it is understood that in capturing a light field image a plurality of light field cameras 52 are required, arranged in an array on the retraction plane 64. The required number of light field cameras 52 is calculated to ensure sufficient capture of the entire outer frustum volume 42 and the inner frustum volume 44 of the light field display. Using an offset parameter of N=2, the blind volumes 76 reside outside the near clip plane 46 and the frustum volume 74 captured by the array of light field cameras at the retraction plane 64 is the complete inner frustum volume 44 and outer frustum volume 42 of the LFD. As such, when setting the offset distance to N=2, both the inner frustum volume 44 and outer frustum volume 42 can be captured in full without blind volumes 76. It is possible to use N=2 without N=1 and as a result the full volume will be captured with one layer. As illustrated in FIG. 11, following decoding of the light field cameras 52, hogel cameras 54 are generated, wherein the hogel camera pitch on the retraction plane 64, is equal to the lens pitch of the display. The hogel cameras 54 are synthesized with their hogel, therefore satisfying the prerequisites for implementing the pixel remapping technique. This synthesis during the decoding stage is performed to generate a virtual image at each hogel camera 54 to generate elemental images, where each elemental image is associated with a single hogel camera 54.

Figure 13:
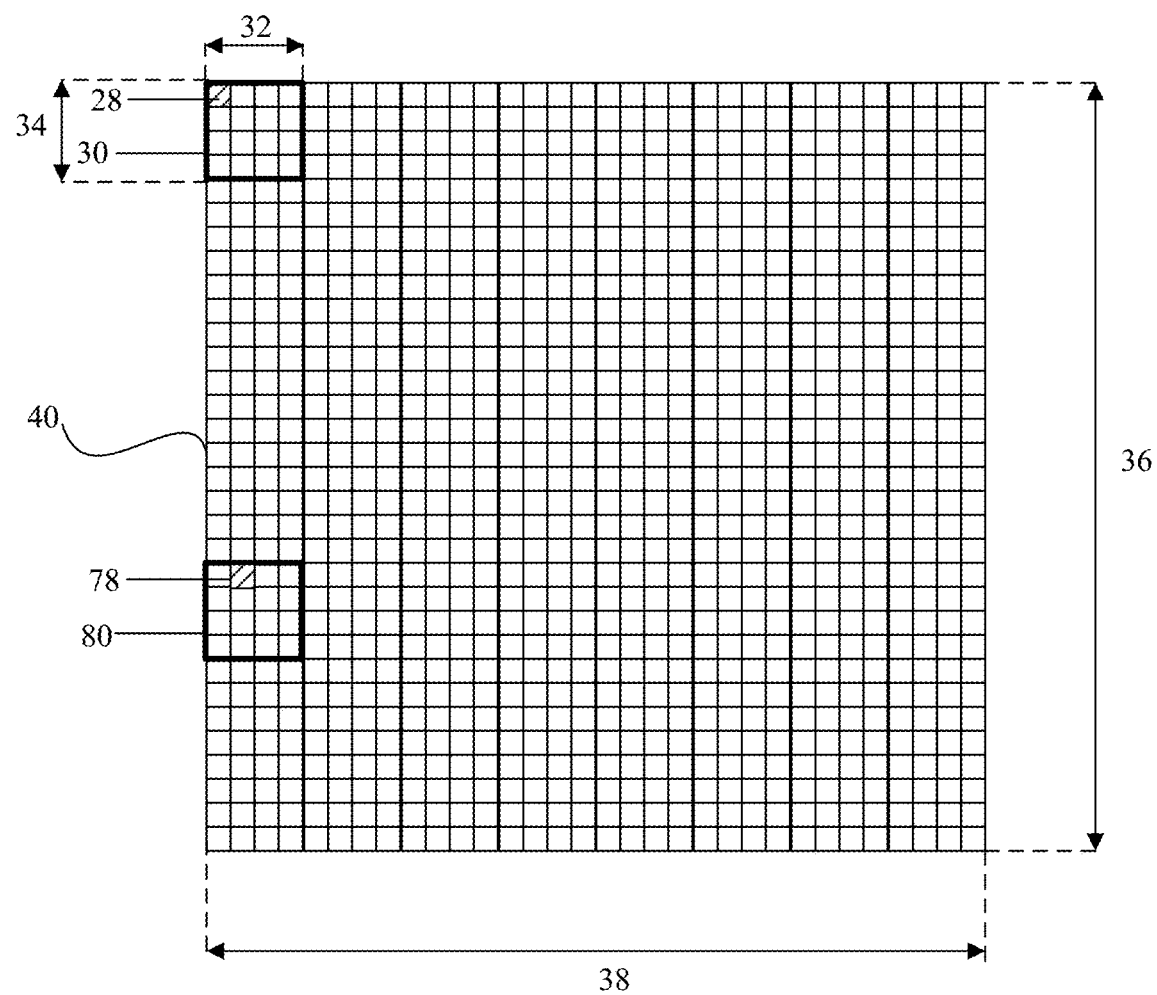
FIG. 13 illustrates indexed hogels and pixels within a light field display.

FIG. 13 illustrates indexing single hogels 30 in an array of hogels 40 comprising pixels 28 within a light field display. In conventional rendering methods, the camera array would be located on the display plane of a light field display to capture images of a 3D scene. As per the method of the present disclosure, a light field camera array can be located on a retraction plane at an offset distance perpendicular to the display plane. Pixel indexing is used to reference individual pixels 28 and hogels 30 contained within the array of hogels 40 comprising the light field. Once each pixel in the light field is indexed, computer software can manipulate the image information, thereby manipulating the light field. For example, computer software can render, transmit, store, alter the color, alter the transparency, etc. of the light field image data captured by the light field cameras. A light field has a spatial resolution and a directional resolution; each of these display properties have an x and y component. Spatial resolution ($SR_x$ 38, $SR_y$ 36) refers to the number of hogels 30 in the hogel grid 40 used to construct a light field image. Spatial resolution x ($SR_x$) 38 indicates the number of hogels 30 along the horizontal, in the x-axis, of the light field display. Spatial resolution y (SR$_y$) 36 indicates the number of hogels 30 along the vertical, in the y-axis of the light field display. The hogel indices (H$_x$, H$_y$) identify the position of each hogel 30 within the spatial resolution of the light field display. Indexing provides the initial location for each pixel 28 and hogel 30, which allows the computer software to process the image. The light field reindexing method utilizes this indexing methodology to manipulate the image to present at a plane parallel to the plane the image was captured on. Directional resolution (DR$_x$ 32, DR$_y$ 34) refers to the number of pixels 28 that comprise each single hogel 30. Directional resolution x (DR$_x$) 32 indicates the number of pixels 28 along the horizontal, in the x-axis, of the hogel 30. Directional resolution y (DR$_y$) 34 indicates the number of pixels 28 along the vertical, in the y-axis of the hogel 30. The pixel indices (P$_x$, P$_y$) identify the position of each pixel 28 within the directional resolution of its hogel 30.

Using the hogel indices (H$_x$, H$_y$) and the pixel indices (P$_x$, P$_y$), each pixel 28 can be indexed to indicate its position in the light field display.

Therefore:

$$LF[H_x, H_y, P_x, P_y]$$

where:

H$_x$ is the hogel index along the x-axis, where the leftmost column is 1

H$_y$ is the hogel index along the y-axis, where the top row is 1

P$_x$ is the pixel index along the x-axis, where the leftmost column is 1

P$_y$ is the pixel index along the y-axis, where the top row is 1

To further illustrate pixel and hogel indexing, refer to indexed hogel 80. Identifying a specific pixel, for example pixel 78 within hogel 80, would be LF[1,6,2,1], where H$_x$=1, H$_y$=6, P$_x$=2, P$_y$=1, which provides the initial location for pixel 78 and hogel 80, allowing the computer software to process the image. A pixel remapping technique utilizes indexing to manipulate the image to present at a plane parallel to the plane the image was captured on.

Pixel indexing is a conventional practice, however the pixel remapping technique as described herein will cause the light field image to move its perceived location while preserving motion parallax. It is given that a pixel remapping technique is, in essence, a hogel remapping technique as hogels are comprised of pixels. However known methods to move an image plane utilize interpolation or subsampling, which reduces the image resolution, fail to maintain motion parallax and increase computational complexity and bandwidth requirements to read additional pixel data from memory. The present method for moving a light field image plane utilizes a pixel remapping technique to offset the hogel index (H$_x$, H$_y$) by the pixel index (P$_x$, P$_y$) by loading each pixel from the light field at the retraction plane (LF$_r$) and storing each pixel to the light field at the display plane (LF$_d$).

Therefore:

$$LF_r[H_x+(DR_x*N)-(N*P_x), H_y(DR_y*N)-(N*P_y), P_x, P_y]$$
$$\Rightarrow LF_d[H_x, H_y, P_x, P_y]$$

where:

LF$_d$ is the light field at the display plane

LF$_r$ is the light field at the retraction plane

H$_x$ is the hogel index along the x-axis, where the leftmost column is 1

H$_y$ is the hogel index along the y-axis, where the top row is 1

P$_x$ is the pixel index along the x-axis, where the leftmost column is 1

P$_y$ is the pixel index along the y-axis, where the top row is 1

DR$_x$ is the directional resolution, the number of pixels, of each hogel in the x-axis DR$_y$ is the directional resolution, the number of pixels, of each hogel in the y-axis N is the offset parameter; an integer to indicate the number of retractions Applying the present pixel remapping technique allows computer software to select a pixel from a retraction plane hogel 30, and modify its indexed position using the following equation LF$_r$[H$_x$+(DR$_x$*N)−(N*P$_x$), H$_y$+(DR$_y$*N)−(N*P$_y$), P$_x$, P$_y$], thus remapping the pixel to a different hogel at the display plane. This method is computationally straight forward for computer software, requiring the computing software to read only one pixel from the retraction plane to produce one pixel at the display plane. This minimizes the mathematical operations, only uses integers, and requires few source images. Comparatively, other methods can require thousands of source images which increases the quantity of data to photograph, render, and/or transmit. Other methods that use few source images can require floating point numbers, i.e., not integer values, which increases computational complexity, therefore increasing time and hardware requirements to produce a light field. For example, a known method of moving an image plane is interpolation. To move the image plane through interpolation each output pixel, for example the pixel at the display plane, would be read from four source pixels, for example the pixels at the retraction plane. Comparatively, in the disclosed light field rendering method, each display plane pixel is read from only one retraction plane pixel. Therefore, the pixel remapping technique requires only one quarter of the data required for interpolation. For commercially available memory devices, such as random-access memory (RAM), double data rate (DDR) memory, synchronous dynamic random-access memory (SDRAM), etc., it has been found that the described method can be performed in one quarter of the time compared to an interpolation method, resulting in a higher frames per second (fps) frame rate. This time and data reduction allows light fields to be transmitted and rendered in real time on commercially available systems, while maintaining resolution and motion parallax, creating a high-quality light field image.

Preferably, the pixel remapping technique only causes the pixels to change their hogel index (H$_x$, H$_y$) from the retraction plane to the display plane. The pixels themselves retain their pixel index (P$_x$, P$_y$) throughout the process. Therefore, the directional resolution of the light field display remains constant while the spatial resolution is changed. The spatial resolution is also changed because the reindex of hogel index H$_x$, H$_y$ requires peripheral (additional) hogels.

In the described method, a display plane hogel receives each pixel from different retraction plane hogels. The retraction plane must be comprised of enough hogels to provide sufficient pixels to achieve the required directional resolution at the display plane for the light field display. The size of the display plane is defined by the directional resolution and spatial resolution of the light field display.

$$\text{Display Plane} = [SR_x, SR_y, DR_x, DR_y]$$

where:

SR$_x$ is the spatial resolution, the number of hogels, of the display in the x-axis $SR_y$ is the spatial resolution, the number of hogels, of the display in the y-axis $DR_x$ is the directional resolution, the number of pixels, of each hogel in the x-axis $DR_y$ is the directional resolution, the number of pixels, of each hogel in the y-axis Following the decoding process, the retraction plane is comprised of additional hogels, herein referred to as peripheral hogels, that provide pixels to display plane hogels. These peripheral hogels ensure that all display plane hogels have the required directional resolution. The number of peripheral hogels is dependent on the directional resolution of the display plane hogels and the offset parameter, N. Therefore:

$$\text{Peripheral Hogels} = [(DR_x * N), (DR_y * N)]$$

Additionally, peripheral hogels satisfy the requirement that every pixel in every hogel on the display plane is populated following the pixel remapping technique. The area of the display plane and subsequently, the number of display plane hogels must be accounted for when capturing and decoding the light field image at the retraction plane to create sufficient peripheral hogels to satisfy the requirements of the light field rendering method to create a high-quality light field image.

Compositing is used to combine multiple remapped planes to create a seamless display that presents in both the inner frustum volume and the outer frustum volume. Compositing is the accurate implementation of the light field rendering method that incorporates transparency information when combining multiple light fields into a single light field image at the display plane. Pixels from each remapped light field $LF_N$ at are loaded into Composite($LF_d$, $LF_N$), blended with transparency data, and stored to the light field at the display plane $LF_d$ to be displayed as a single light field image.

Therefore:
For each $LF_N$:
  for each hogel:
    for each pixel:

$$LF_d[H_x,H_y,P_x,P_y] = \text{Composite}(LF_d[H_x,H_y,P_x,P_y], LF_N[H_x+DR_x-P_x,H_y+DR_y-P_y,P_x,P_y])$$

where:
$LF_d$ is the light field at the display plane
$LF_r$ is the light field at the retraction plane
$H_x$ is the hogel index along the x-axis, where the leftmost column is 1
$H_y$ is the hogel index along the y-axis, where the top row is 1
$P_x$ is the pixel index along the x-axis, where the leftmost column is 1
$P_y$ is the pixel index along the y-axis, where the top row is 1
$DR_x$ is the directional resolution, the number of pixels, of each hogel in the x-axis
$DR_y$ is the directional resolution, the number of pixels, of each hogel in the y-axis where Composite($LF_d$, $LF_N$) will return either the remapped pixel or a blended pixel, depending on the type of transparency data. Each remapped light field is composited to the display plane, in order of ascending offset parameter, N, values. In the absence of transparency data, Composite($LF_d$, $LF_N$) will write the remapped pixel to the display plane as:

$$\text{Composite}(LF_d, LF_N) \rightarrow \text{Return } LF_N$$

After compositing, the remapped pixel is stored at the display plane and is ready to be displayed. Without transparency data, compositing multiple light fields with different N values to a light field at the display plane would result in the last light field that was composited to the display plane to be the only visible light field image. Transparency data incorporates various levels of transparency and opacity for each element within the image that when multiple light field images are composited together, allows the opaque elements to be visible when closer to the far clip plane than transparent elements. Transparency data is essential when compositing multiple light fields into a single light field image at the display plane to provide a 3D layered light field image. Commercially available physical light field cameras do not capture transparency data when capturing an image as the camera's sensors capture the intensity of color: red, blue, green. Source images from physical light field cameras can be processed using methods including but not limited to temporal median filtering, interactive foreground extraction, to incorporate transparency data into the image before rendering. In the presence of transparency data, Composite ($LF_d$, $LF_N$) will return a blend of the light field at the retraction plane and the light field at the display plane.

$$\text{Composite}(LF_d, LF_N) \rightarrow \text{Return Blend}(LF_d, LF_N)$$

The two light fields are then combined using the transparency data to blend. Once blended, the pixels can be stored at the display plane and are ready to be displayed. In embodiments with multiple light fields, compositing loads the light fields in series starting with the light fields closest to the far clip plane, the light fields that originally had the lowest N value and shortest offset distance. Each rendered light field is composited to the display plane until all light fields have been composited into a single light field at the display plane. Compositing with transparency data ensures that once composited into a single light field image the objects maintain their appropriate depth, transparency, and obscurity, further improving the light field's motion parallax. This ensures that objects in the light field closest to the near clip plane are completely visible from all angles within the display's field of view, i.e., no objects obscuring their front-most surface, objects further from the near clip plane will be partially or entirely covered, and each objects' obscurity is dependent upon obscuring objects that lie between the object in question and the near clip plane and the transparency of the obscuring object. For example, an object located on the far clip plane may be fully visible if there are no obscuring objects between the object in question and the near clip plane or any obscuring object is partially or fully transparent. Compositing combines multiple light fields from retraction planes incorporates transparency data and stores them to a single light field at the display plane to create a light field image that contains images of the physical world and presents both in the inner frustum volume and the outer frustum volume, while maintaining motion parallax.

Figure 14:
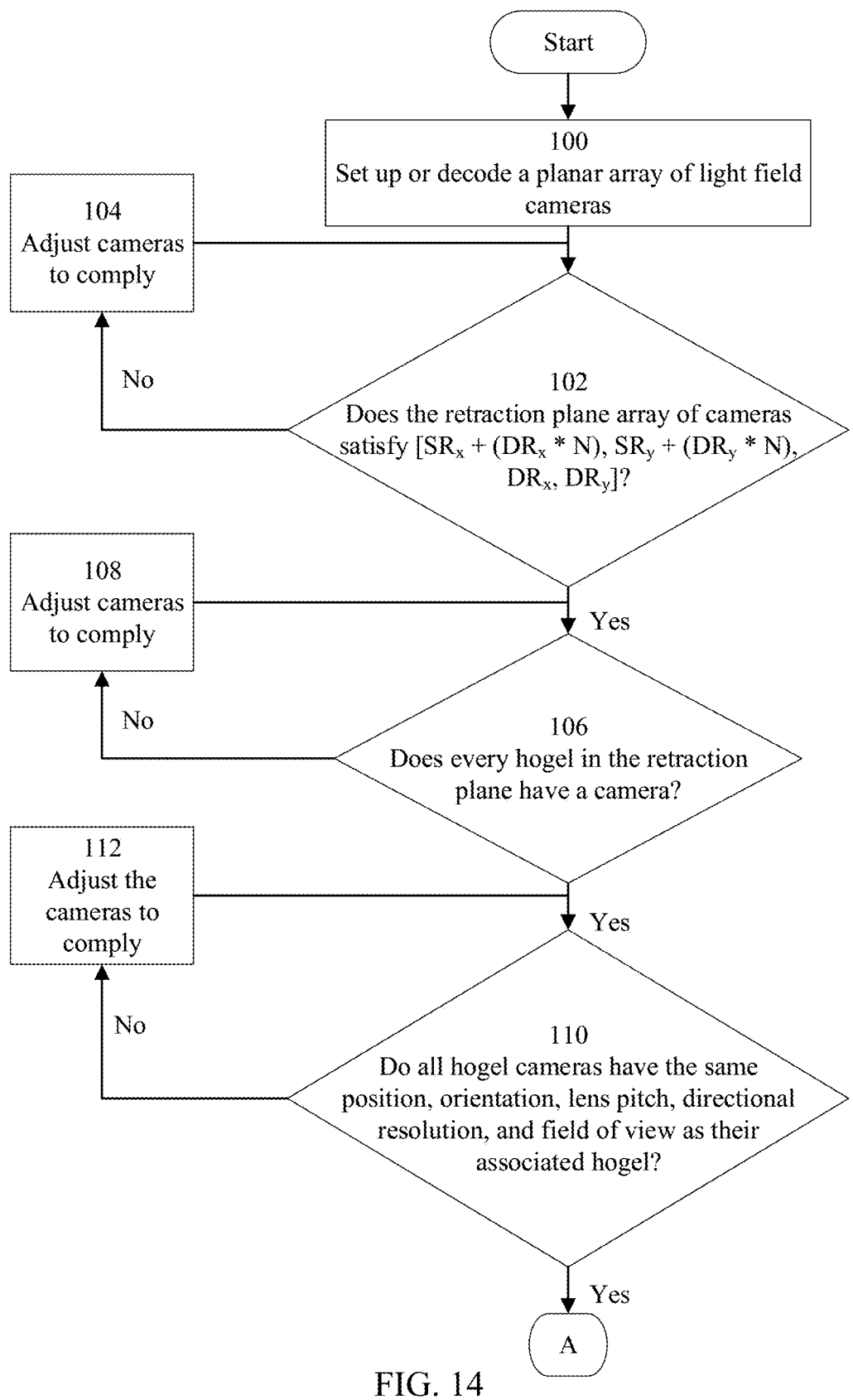
FIG. 14 is a flow diagram of a light field rendering method.

FIG. 14 is a flow diagram of an example light field rendering method. Before the method can begin, the light field camera array needs to satisfy a series of prerequisites. The first step is to set up or decode a planar array of light field cameras 100. The planar array of cameras can be physical cameras such as, for example, a digital single reflex mirror (DSLR) camera, pinhole camera, plenoptic camera, compact camera, mirrorless camera, etc., or an array of computer-generated or virtual cameras. Decoding methods, such as depth image-based rendering, reprojecting color-plus-depth images, etc., generate an array of virtual hogel cameras that display an image in a hogel where physical cameras are not present or cannot due to size limitations. After decoding, the distance between light field cameras on the retraction plane is equal to the sample gap, which is also the lens pitch of the display. The initial planar array of light field cameras is decoded to generate a hogel camera in every hogel so that the final display plane array of cameras has the shape [$SR_x$, $SR_y$, $DR_x$, $DR_y$]. $SR_x$ is the spatial resolution of the display in the x-axis, $SR_y$ is the spatial resolution of the display in the y-axis, $DR_x$ is the directional resolution of the display in the x-axis, $DR_y$ is the directional resolution of the display in the y-axis. This sets the parameters of the final light field display, after the rendering performed. Step 102 asks: does the retraction plane array of light field cameras satisfy [$SR_x+(DR_x*N)$, $SR_y+(DR_y*N)$, $DR_x$, $DR_y$]? 102, where the offset parameter, N, indicates the number of retractions. This ensures the retraction plane contains sufficient hogels to provide the display plane with the full directional resolution ($DR_x$, $DR_y$) and spatial resolution ($SR_x$, $SR_y$) required to create the integral image. If the answer to step 102 is no, the algorithm adjusts the cameras to comply 104 and returns to step 102. If yes, the algorithm proceeds to step 106. Step 106 asks: does every hogel in the retraction plane have a camera? Every hogel on the retraction plane requires a hogel camera, as the cameras provide their associated hogel with an image. This step ensures that all hogels on the retraction plane have a camera and therefore each hogel has an image. If no, the algorithm adjusts cameras to comply 108 and returns to step 106. If yes, the algorithm proceeds to step 110. Step 110 asks: do all hogel cameras have the same position, orientation, lens pitch, directional resolution, and field of view as their associated hogel? Each hogel camera must have the same position as their associated hogel to ensure the image the camera provides the hogel is correct for the hogel's position. Subsequently, the hogel cameras must have the same optical properties; orientation, lens pitch, directional resolution and field of view; as their associated hogel to ensure the image the camera shares the hogel's optical properties. When the optical properties of the hogel cameras and their respective hogels match, light rays from pixels in the retraction plane will intersect on the display plane, allowing the method to remap the perceived location of the integral image to the display plane. If no, the algorithm adjusts the cameras to comply 112 and returns to step 110. If yes, the algorithm proceeds to step 114 in FIG. 15.

Figure 15:
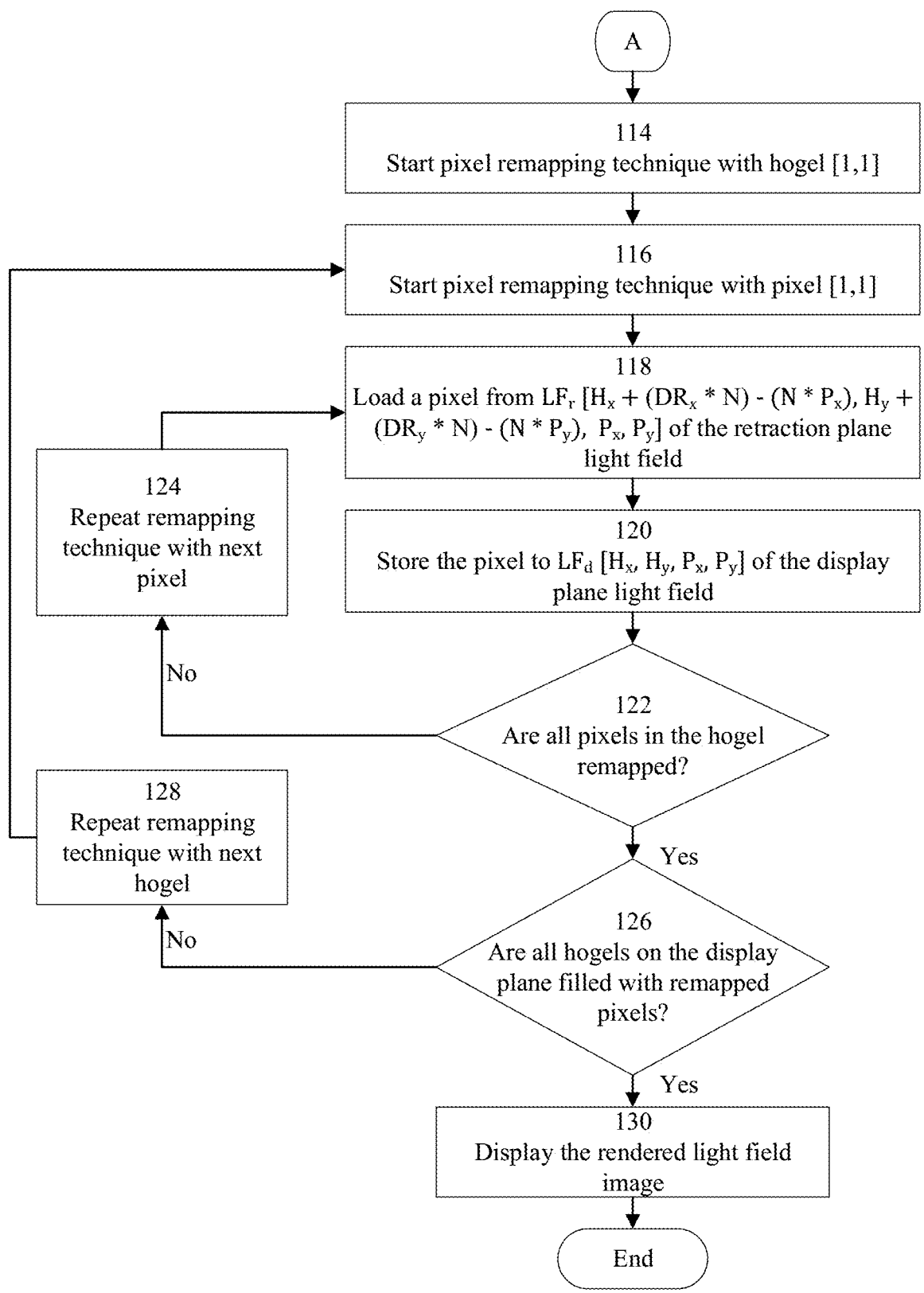
FIG. 15 is a flow diagram of a light field rendering method including a pixel remapping technique.

FIG. 15 is a flow diagram of an example light field rendering method including a pixel remapping technique. Once all prerequisites, steps 100-112 of FIG. 14, are satisfied, the algorithm proceeds to: start pixel remapping technique with hogel [1,1] 114. The first hogel that is remapped can be any hogel within the display. In this embodiment, hogel [1,1] was used for simplicity. Once the hogel is selected, the pixel remapping technique starts with pixel [1,1] 116. The first pixel within the hogel that is remapped can be any pixel. In this embodiment, pixel [1,1] was used for simplicity. First, a pixel is loaded from $LF_r[H_x+(DR_x*N)-(N*P_x)$, $H_y+(DR_y*N)-(N*P_y)$, $P_x$, $P_y]$ of the retraction plane light field 118, where $H_x$, $H_y$ indicates a particular hogel in the display and $P_x$, $P_y$ indicates a particular pixel within a hogel. This step remaps each pixel from the retraction plane to the display plane. The bounds of the hogels ($H_x$, $H_y$) are based on the spatial resolution ($SR_x$, $SR_y$) of the display. In this embodiment, the bounds $1 \leq H_x \leq SR_x$ and $1 \leq H_y \leq SR_y$ are chosen for simplicity but can vary depending on how the hogels are indexed, i.e. the bounds could be $0 \leq H_x \leq SR_x-1$ and $0 \leq H_y \leq SR_y-1$. The bounds of the pixels ($P_x$, $P_y$) are based on the directional resolution ($DR_x$, $DR_y$) of the hogels. In this embodiment, the bounds $1 \leq P_x \leq DR_x$ and $1 \leq P_y \leq DR_y$ are chosen for simplicity but can vary depending on how the pixels are indexed, i.e. the bounds could be $0 \leq P_x \leq DR_x-1$ and $0 \leq P_y \leq DR_y-1$. After the pixel is loaded from the retraction plane, the pixel is stored to $LF_d[H_x, H_y, P_x, P_y]$ of the display plane light field 120. Step 120 stores the remapped pixel in the display plane that allows it to be displayed as a light field image. One key advantage of this method is that the entire operation is to load from one address, in this embodiment the retraction plane, and store to another address, in this embodiment the display plane. Compared to known methods, the disclosed rendering method does not require execution of additional operations on the loaded data. Once loaded to the display plane, the data is an integral image and can present as a light field.

After each pixel is stored to the display plane light field in step 120, the next step 122 asks: are all pixels in the hogel remapped? If no, the algorithm repeats light field reindexing method with next pixel 124, which commences loading the next pixel in step 118. If yes, the algorithm proceeds to step 126. After all pixels within a hogel are stored to the display plane light field, the next step asks: are all hogels on the display plane filled with remapped pixels? 126. If no, the algorithm repeats remapping technique with next hogel 128, which commences loading a pixel in the next hogel in step 116. If yes, the algorithm proceeds to step 130. Once all pixels within all hogels are remapped by being loaded and stored to their respective display plane hogel, all conditions of the method are satisfied, and the light field display is able to display the rendered light field image 130.

Figure 16:
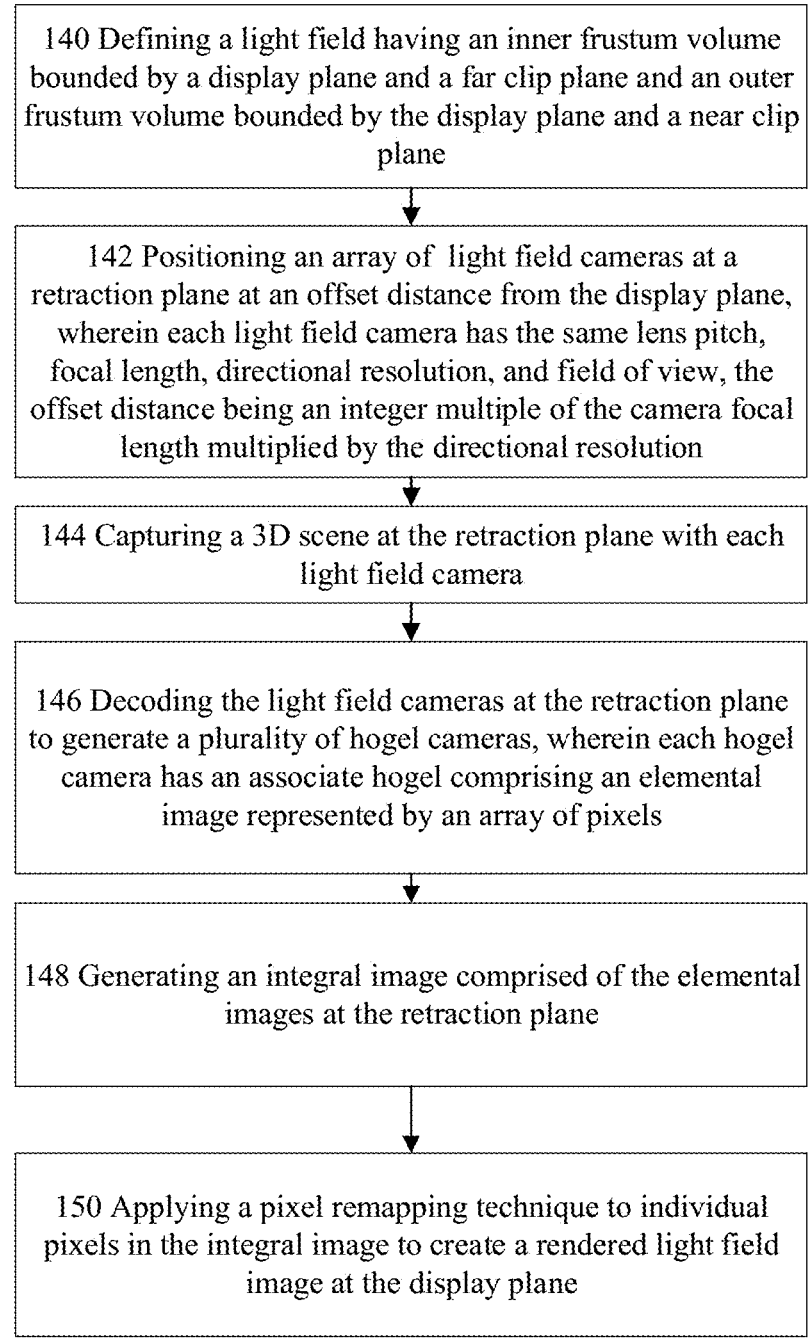
FIG. 16 is a flow diagram of a light field rendering method process according to the present disclosure.

FIG. 16 is a flow diagram of a light field rendering method process illustrating a computer-implemented method comprising:
  a. defining a light field display having an inner frustum volume bounded by a display plane and a far clip plane and an outer frustum volume bounded by the display plane and a near clip plane 140;
  b. positioning an array of light field cameras with at a retraction plane at an offset distance from the display plane, wherein each light field camera has the same lens pitch, focal length, directional resolution, and field of view, the offset distance being an integer multiple of the camera focal length multiplied by the directional resolution 142;
  c. capturing a 3D scene at the retraction plane with each light field camera 144 as a set of source images, with one source image for each light field camera;
  d. decoding the light field cameras at the retraction plane to generate a plurality of hogel cameras, wherein each hogel camera has an associate hogel comprising an elemental image represented by an array of pixels 146;
  e. generating an integral image comprised of the elemental images at the retraction plane 148; and
  f. applying a pixel remapping technique to individual pixels in the integral image to create a rendered light field image at the display plane 150.

All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

The invention being thus described, it will be obvious that the same may be varied in many ways. Such variations are not to be regarded as a departure from the scope of the invention, and all such modifications as would be obvious to one skilled in the art are intended to be included within the scope of the following claims.

We claim:

1. A computer-implemented light field rendering method comprising:
    defining a display plane for a light field display with a spatial resolution and a directional resolution, the light field display comprising an inner frustum volume bounded by the display plane and a far clip plane and an outer frustum volume bounded by the display plane and a near clip plane;
    defining a retraction plane parallel to and at an integral offset distance from the display plane, the retraction plane comprising a plurality of light field cameras, each camera having a focal length and spaced at a sample gap, wherein the integral offset distance is calculated from the focal length, directional resolution of the light field display, and an offset integer, N≥1;
    capturing a view of the 3D scene as a source image at each of the plurality of light field cameras;
    decoding each source image to generate a plurality of hogel cameras on the retraction plane, each hogel camera providing an elemental image;
    generating an integral image comprising a plurality of pixels from the elemental images at the retraction plane; and
    executing a pixel remapping technique on individual pixels in the integral image to create a rendered light field image at the display plane.

2. The method of claim 1, wherein the view of the 3D scene captured at the plurality of light field cameras at the retraction plane comprises image information from the inner frustum volume and the outer frustum volume.

3. The method of claim 1, wherein the captured view of the 3D scene comprises all of the image information in the outer frustum volume.

4. The method of claim 1, wherein the retraction plane is positioned at the near clip plane.

5. The method of claim 1, further comprising displaying the rendered light field image on a light field display.

6. The method of claim 1, wherein the retraction plane surface area is greater than the display plane surface area.

7. The method of claim 1, wherein the plurality of light field cameras have optical properties comprising orientation, lens pitch, directional resolution, and field of view.

8. The method of claim 1, further comprising generating a plurality of integral images at a plurality of retraction planes.

9. The method of claim 8, further comprising compositing the plurality of integral images to create a composited rendered light field image at the display plane.

10. The method of claim 9, wherein compositing incorporates transparency data.

11. The method of claim 1, wherein each light field camera is one of a digital single reflex mirror (DSLR) camera, pinhole camera, plenoptic camera, compact camera, and mirrorless camera.

12. The method of claim 1, wherein each light field camera is a computer-generated camera.

13. The method of claim 1, wherein the pixel remapping technique causes the pixels to change their hogel index ($H_x$, $H_y$) from the retraction plane to the display plane.

14. The method of claim 1, wherein the retraction plane is outside of the outer frustum volume.

15. A computer-implemented method of displaying a light field image comprising:
    capturing a first light field at a retraction plane relative to a light field display plane using a light field camera, the first light field comprising an array of retraction plane hogels, each hogel having a plurality of pixels, the retraction plane positioned at an integral offset distance from the display plane, the integral offset distance calculated as an offset integer N, where N≥1;
    assigning a hogel index ($H_x$, $H_y$) and a pixel index ($P_x$, $P_y$) to each pixel in each retraction plane hogel to indicate its position in the light field display by applying a pixel remapping technique to select a single pixel from each retraction plane hogel;
    loading each pixel from the light field at the retraction plane ($LF_r$) and storing each pixel to the light field at the display plane ($LF_d$) using a compositing function; and
    generating a light field image at the display plane comprising remapped pixels.

16. The method of claim 15, wherein one pixel from the retraction plane produces one pixel at the display plane.

17. The method of claim 15, wherein applying a pixel remapping technique changes the hogel index ($H_x$, $H_y$) of each pixel in each retraction plane hogel and the pixel index ($P_x$, $P_y$) remains constant.

18. The method of claim 17, wherein the pixel remapping technique is based on the equation $LF_r[H_x+(DR_x*N)-(N*P_x), H_y+(DR_y*N)-(N*P_y), P_x, P_y] \Rightarrow LF_d[H_x, H_y, P_x, P_y]$.

19. The method of claim 15, wherein the pixel remapping technique is a function of the directional resolution of the light field display and the offset integer, N.

20. The method of claim 15, wherein the retraction plane is comprised of a sufficient number of hogels to provide the number of pixels to achieve the required directional resolution of light field display at the display plane.

21. The method of claim 15, wherein the size of the display plane is defined by the directional resolution and spatial resolution of the light field display.

22. The method of claim 15, wherein the light field camera is a mirror (DSLR) camera, pinhole camera, plenoptic camera, compact camera, or mirrorless camera.

* * * * *